United States Patent [19]

Koga et al.

[11] Patent Number: 5,717,794
[45] Date of Patent: Feb. 10, 1998

[54] DOCUMENT RECOGNITION METHOD AND SYSTEM

[75] Inventors: Masashi Koga, Kokubunji; Katsumi Marukawa, Kodaira; Yoshihiro Shima, Tokorozawa; Kazuki Nakashima, Kokubunji, all of Japan

[73] Assignee: Hitachi, Ltd., Tokyo, Japan

[21] Appl. No.: 725,477

[22] Filed: Oct. 4, 1996

Related U.S. Application Data

[63] Continuation of Ser. No. 214,204, Mar. 17, 1994, abandoned.

[30] Foreign Application Priority Data

Mar. 17, 1993 [JP] Japan .................................. 5-057441

[51] Int. Cl.$^6$ .............................. G06K 9/03; G06K 9/34; G06K 9/72; G06K 9/36
[52] U.S. Cl. ........................ 382/309; 382/177; 382/229; 382/276; 382/311; 382/203
[58] Field of Search ................................. 382/173, 229, 382/302, 276, 309, 310, 311, 317, 177, 203, 190; 364/737

[56] References Cited

U.S. PATENT DOCUMENTS

| | | | |
|---|---|---|---|
| 4,860,376 | 8/1989 | Tanaka et al. | 382/57 |
| 5,129,012 | 7/1992 | Abe | 382/16 |
| 5,150,434 | 9/1992 | Hori et al. | 382/57 |
| 5,233,672 | 8/1993 | Yamanari et al. | 382/57 |
| 5,265,171 | 11/1993 | Sangu | 382/9 |
| 5,282,052 | 1/1994 | Johnson et al. | 358/402 |
| 5,355,420 | 10/1994 | Bloomberg et al. | 382/46 |
| 5,369,716 | 11/1994 | Sangu | 382/61 |

FOREIGN PATENT DOCUMENTS

| | | | |
|---|---|---|---|
| A-4-75184 | 3/1992 | Japan | G06K 9/03 |
| A-4-75185 | 3/1992 | Japan | G06K 9/03 |
| A-4-155482 | 5/1992 | Japan | G06K 9/03 |

*Primary Examiner*—Leo Boudreau
*Assistant Examiner*—Bipin Shalwala
*Attorney, Agent, or Firm*—Antonelli, Terry, Stout, & Kraus, LLP

[57] ABSTRACT

A document recognition system includes various recognitive steps for document recognition, and various correctional steps corresponding to the recognitive steps. The operation modes of the system are a "sequential mode" (sequential recognition operation) in which the respective recognitive steps are executed in "step by step" fashion, an "auto mode" (batch recognition operation) in which all the recognitive steps are collectively executed, and a "retry mode" (re-recognition operation) in which the execution of any of the correctional steps is automatically followed by the execution of a necessary one of the recognitive steps. In the "sequential mode", any of the recognitive steps having been executed can be shifted, not only to the correctional step corresponding to the executed recognitive step, but also to the correctional step preceding the execution. When an error is involved in a recognized result because the limits of a character line recognized by the system are incorrect, the user of the system corrects the limits of the character line. Then, the system can execute the necessary recognitive step again based on the corrected limits of the character line.

21 Claims, 33 Drawing Sheets

FIG.8

| CORRECTION STEPS \ STEPS TO BE EXECUTED | AREA AUTO-SETUP | CHAR LINE EXTRACTION | SKEW ALTERATION | LAYOUT ANALYSIS | CHAR SEGMENTATION | CHAR RECOGNITION | LANGUAGE PROCESSING |
|---|---|---|---|---|---|---|---|
| AREA CORRECTION |  | ○ | ○ | ○ | ○ | ○ | ○ |
| CHAR LINE CORRECTION |  |  | ○ | ○ | ○ | ○ | ○ |
| SKEW CORRECTION | ○ |  |  | ○ | ○ | ○ | ○ |
| LAYOUT CORRECTION |  |  |  |  | ○ | ○ | ○ |
| CHAR SEGMENTATION CORRECTION |  |  |  |  |  | ○ | ○ |
| CHAR CORRECTION |  |  |  |  |  |  | ○ |

FIG.9

| CORRECTION STEPS \ STEPS TO BE EXECUTED | FILE INPUT | SCANNER INPUT | AREA AUTO SETUP | AREA CORRECTION | NOISE FILTERING SETUP | HALFTONE DOT ELIMINATION | CHARLINE EXTRACTION | LAYOUT CORRECTION | DOCUMENT ANALYSIS | SKEW DETECTION DIRECTION DISCRIMINATION | SKEW CORRECTION | CHAR ALTERATION | CHAR SEGMENTATION | CHAR RECOGNITION | LANGUAGE PROCESSING | PHRASE CORRECTION |
|---|---|---|---|---|---|---|---|---|---|---|---|---|---|---|---|---|
| FORMAT INPUT | ○ | ○ | ○ | | | | | | | | | | | | | |
| SCANNER SETUP | | ○ | ○ | | | | | | | | | | | | | |
| AREA SETUP | | | ○ | ○ | | | | | | | | | | | | |
| AREA OPTION SETUP — TYPE | | | | ○ | ○ | ○ | ○ | ○ | | | | | ○ | ○ | ○ | |
| AREA OPTION SETUP — CHAR LINE | | | | | ○ | ○ | ○ | ○ | ○ | | | | ○ | ○ | ○ | |
| AREA OPTION SETUP — CHAR | | | | | | ○ | ○ | ○ | ○ | | | | ○ | ○ | ○ | |
| DOCUMENT DIRECTION | | | | | | | ○ | ○ | ○ | ○ | | | ○ | ○ | ○ | |
| NOISE FILTERING | | | | | ○ | ○ | ○ | ○ | ○ | ○ | ○ | ○ | ○ | ○ | ○ | |
| HALFTONE DOT ELIMINATION | | | | | | ○ | ○ | ○ | ○ | ○ | ○ | ○ | ○ | ○ | ○ | |
| SKEW CORRECTION | | | | | | | ○ | ○ | ○ | ○ | ○ | ○ | ○ | ○ | ○ | |
| SKEW ALTERATION | | | | | | | ○ | ○ | ○ | ○ | ○ | ○ | ○ | ○ | ○ | |
| CHAR LINE CORRECTION | | | | | | | ○ | ○ | ○ | ○ | ○ | ○ | ○ | ○ | ○ | |
| LAYOUT CORRECTION | | | | | | | | ○ | ○ | ○ | ○ | ○ | ○ | ○ | ○ | |
| CHAR SEGMENTATION CORRECTION | | | | | | | | | | | | | ○ | ○ | ○ | |
| CHAR CORRECTION | | | | | | | | | | | | | | ○ | ○ | |
| PHRASE CORRECTION | | | | | | | | | | | | | | | ○ | |

FIG.14

| | 1401 | 1402 | 1403 | |
|---|---|---|---|---|
| AREA AUTO-SETUP | 1 | 2 | 1 | 1404 |
| AREA CORRECTION | 1 | 2 | 1 | |
| CHAR LINE EXTRACTION | 1 | 3 | 1 | |
| CHAR LINE CORRECTION | 1 | 3 | 0 | |
| SKEW CORRECTION | 0 | — | 0 | |
| SKEW ALTERATION | 0 | — | 1 | |
| LAYOUT ANALYSIS | 1 | 5 | 1 | |
| LAYOUT CORRECTION | 1 | 5 | 0 | |
| CHAR SEGMENTATION | 1 | 6 | 1 | |
| CHAR SEGMENTATION CORRECTION | 1 | 7 | 0 | |
| CHAR RECOGNITION | 1 | 8 | 1 | |
| CHAR CORRECTION | 1 | 8 | 1 | |
| LANGUAGE PROCESSING | 0 | — | 1 | |
| PHRASE CORRECTION | 0 | — | 1 | |

- EXECUTION DESIGNATION FLAG
- EQUIVALENT STEP VALUE
- INDISPENSABLE STEP FLAG

DOCUMENT RECOGNITION METHOD AND SYSTEM

This application is a continuation application of Ser. No. 08/214,204, filed Mar. 17, 1994, now abandoned.

BACKGROUND OF THE INVENTION

1. Field of the Invention

The present invention relates to a document recognition system for recognizing characters contained in documents and drawings.

2. Description of the Related Art

In recent years, large quantities of documents have been in circulation due to the progress of printing systems and the spread of copiers as well as word processors, and accordingly the demand for storing them as text data in computers has also risen. In an attempt to meet with this demand, there has been developed a document recognition system wherein, using pattern recognition and knowledge processing techniques, characters in a document image are recognized and then delivered as text data by an electronic computer. Under the existing circumstances, however, the document recognition has not yet attained a satisfactory correct recognition rate. It is therefore necessary for the operator of the system to enter various parameters before the recognition processing and to correct a recognized result after the recognition. In order to increase thee efficiency of the input operation of the text data, accordingly, the efficiencies of such operator's jobs need to be taken into consideration simultaneously with raising the processing speed of the document recognition system.

A known expedient for correcting the result of the document recognition is a system wherein text codes as the recognized result are displayed on a CRT (cathode-ray tube) and are corrected by designating a correctional position, deleting the corresponding text code and entering a new text code with a mouse and a keyboard.

In this regard, there has been known a system wherein the image of an object to be recognized is simultaneously displayed adjacent to the recognized result, thereby enhancing the job efficiency. There has also been known a system wherein the second et seq. candidate characters for the character recognition are displayed to allow the operator to choose a right answer or character.

Besides, in a system wherein the result of the character recognition is corrected by language processing (processing in which the errors of the character recognition are corrected in accordance with word collation, morphological analysis, semantic analysis, or the like), there has been known a method wherein, when the language processing has revealed a plurality of erroneous characters within one sentence, the operator corrects some of the errors and thereafter starts the language processing again, whereby the other errors are also corrected automatically.

The language processing based on the word collation will be explained with reference to FIG. 31. By way of example, consider a case where a document recognition system 3102 has recognized an incorrect phrase "中文留米市" in the recognition of a document, and where the recognized result has been displayed on an output unit such as a CRT. In this case, the operator corrects a character "中" in the phrase "中文留米市" into a character "東" by using an input unit such as a keyboard, and thereafter causes the document recognition system 3102 to execute the language processing as postprocessing. Then, the document recognition system 3102 recognizes a phrase "東文留米市" as a correct phrase "東久留米市" with reference to a language dictionary 3101.

The language processing based on the morphological analysis is processing which decides if the array of words is grammatically correct Japanese language, and which corrects errors. According to this processing, "日本語として言葉" or "correctly language for Japanese", for example, is corrected into "日本語として正しい言葉" or "correct language for Japanese".

The language processing based on semantic analysis is a processing which decides if a character string in the Japanese language or any other language is semantically correct, and which corrects errors. According to this processing, "ボートをこる" or "raw a boat", for example, is corrected into "ボートをこぐ" or "row a boat".

Further, a method is known wherein, in advance of the recognition processing, an area to-be-processed in an image is designated by the use of a mouse or the like, and parameters which represent the options or attributes of an object to-be-recognized (such as vertical or horizontal writing, a character size and a character type) within the area are also designated so as to inform a recognition system of the parameters, thereby enhancing the precision of various steps such as character line extraction, character segmentation and character recognition.

Still further, there has been a method wherein, as disclosed in the official gazette of Japanese Patent Application Laid-open No. 155482/1992, the user of a recognition system designates how to segment characters.

In this method, when a single character on an original document has been erroneously segmented and recognized as two or more independent characters, the user informs the system of an area in which the segmented characters ought to be recognized as the single character, and he/she causes the system to execute the character recognition again.

Systems wherein, similarly to the above, when some of the recognized characters are corrected (connected or segmented), misread characters nearby are simultaneously corrected, are disclosed in the official gazettes of Japanese Patent Applications Laid-open No. 75184/1992 and No. 75185/1992.

Meanwhile, in a text reader which reads the characters of a text document, the processing steps of layout analysis, character line extraction, character segmentation, character recognition, language processing, etc. are executed in a plurality of stages. Recognitive errors or misrecognition might develop, not only at the step of character recognition, but also at such steps as layout analysis, character line extraction, character segmentation and language processing.

According to the prior-art techniques, the errors which develop at the steps of layout analysis, character line extraction, character segmentation, etc. cannot be efficiently corrected.

SUMMARY OF THE INVENTION

In view of the problem mentioned above, the present invention has for its object to suggest in detail the specifications of a method and a system which can efficiently correct the errors developing at the steps of layout analysis, character line extraction, character segmentation, etc.

According to the present invention, there is provided a document recognition system wherein characters on a document are recognized from an image of the document, and at least the recognized characters are displayed on a display unit, comprising:

input means for entering the document image which is an object to be recognized;

character line extraction means for obtaining character line data which indicate limits of a character line formed of a character string on the document image entered by the input means;

character line correction means for presenting the limits of the character line obtained by the character line extraction means to a user of the document recognition system in superposition on the document image on the display unit, and for correcting the limits of the character line in accordance with an instruction given by the user;

character segmentation means for deriving character patterns of the individual characters contained in the character line, from the document image on the basis of the character line data;

character recognition means for recognizing the character patterns derived by the character segmentation means, and for converting the recognized character patterns into respectively corresponding character codes; and means for causing the display unit to display the character codes of the characters recognized by the character recognition means.

Due to this construction, the user can inform the system of the correct limits of a character line against the limits of the character line misrecognized by the system. As a result, rapid correction processing can be realized.

From another standpoint, the present invention provides a document recognition system wherein characters on a document are recognized from an image of the document, and at least the recognized characters are displayed on a display unit, comprising:

input means for entering the document image which is an object to be recognized;

character line extraction means for gaining character line data which indicate limits of a character line formed of a character string on the document image entered by the input means;

layout analysis means for recognizing as a block a group which consists of a plurality of such character lines, and for determining a sequence in which a plurality of such blocks are read;

character segmentation means for detecting a first character segmentation position being the most probable and a second character segmentation position being the second most probable, and for successively deriving character patterns of the individual characters contained in the character lines, at the first and second character segmentation positions from the document image, on the basis of the block reading sequence and the character line data;

character recognition means for recognizing the character patterns derived by the character segmentation means, and for converting the recognized character patterns into respectively corresponding character codes;

language processing means for recognizing any inappropriate phrases in text data which consist of the character codes of the character string recognized by the character recognition means, with reference to a language dictionary;

means for causing the display unit to display a processed result of the language processing means;

character line correction means for presenting the limits of the character line obtained by the character line extraction means to a user of the document recognition system, in superposition on the document image on the display unit, and for correcting the limits of the character line in accordance with an instruction given by the user;

skew correction means for correcting that a skew angle of the document image displayed on the display unit which has been detected by the system, in accordance with an instruction given by the user;

layout correction means for presenting limits of the block recognized by the layout analysis means, to the user in superposition on the document image on the display unit, and for correcting the presented limits of the block in accordance with an instruction given by the user;

character segmentation correction means for presenting the first and second character segmentation positions to the user in superposition on the document image on the display unit, for correcting the character segmentation;

character correction means for presenting the characters corresponding to the character codes obtained by the character recognition means, to the user on the display unit, and for correcting the character codes in accordance with an instruction given by the user; and phrase correction means for presenting the inappropriate phrase recognized by the language processing means, to the user, for correcting the inappropriate phrase in accordance with an instruction given by the user.

Preferably, this system further comprises means for selectively starting any executable one of the character line correction means, the layout correction means, the character segmentation correction means, the character correction means and the phrase correction means, immediately after any of the processing steps of the character line extraction means, the layout analysis means, the character segmentation means, the character recognition means and the language processing means. Thus, execution of any step of the recognition processing can be followed by the correction processing for the step already executed. Therefore, efficient correction processing can be realized.

It is also preferable that the system further comprises retry control means which includes a control table for stipulating combinations of the character line extraction means, the layout analysis means, the character segmentation means, the character recognition means and the language processing means which are to execute the processing steps after execution of the corresponding processing step of each of the character line correction means, the layout correction means, the character segmentation correction means, the character correction means and the phrase correction means, and start means for automatically starting the means to execute the processing steps in succession with reference to the control table. Thus, as to any correction processing, only the remaining recognition processing steps which correspond to the correction processing can be automatically executed. The means (processing) which the retry control means starts for the individual correction processing can be stipulated by the control table, so that the flexibility of the system is enhanced.

Further, it is preferable that the system further comprises batch control means which includes a control table for stipulating those of the character line extraction means, the layout analysis means, the character segmentation means, the character recognition means, the language processing means, the character line correction means, the layout correction means, the character segmentation correction means, the character correction means and the phrase correction means which are to be started, along with a sequence of the starts, and means for automatically starting the means stipulated in the control table, in succession in the starting sequence. Owing to the batch recognition control means, all the processing necessary for the document recognition can be automatically executed. The processing, however, can also include steps for manual corrections etc. which are to be done by the user. The means (processing) which the batch recognition control means starts can also be stipulated by the control table, so that the flexibility of the system is enhanced.

BRIEF DESCRIPTION OF THE DRAWINGS

FIG. 8 is a diagram showing a table for controlling the "retry" processing in the example of FIG. 6;

FIG. 9 is a diagram showing another example of the table for controlling the "retry" processing;

FIG. 14 is a diagram showing a table for controlling the "auto" processing in the example of FIG. 6;

DETAILED DESCRIPTION OF THE PREFERRED EMBODIMENTS

Figure 1:
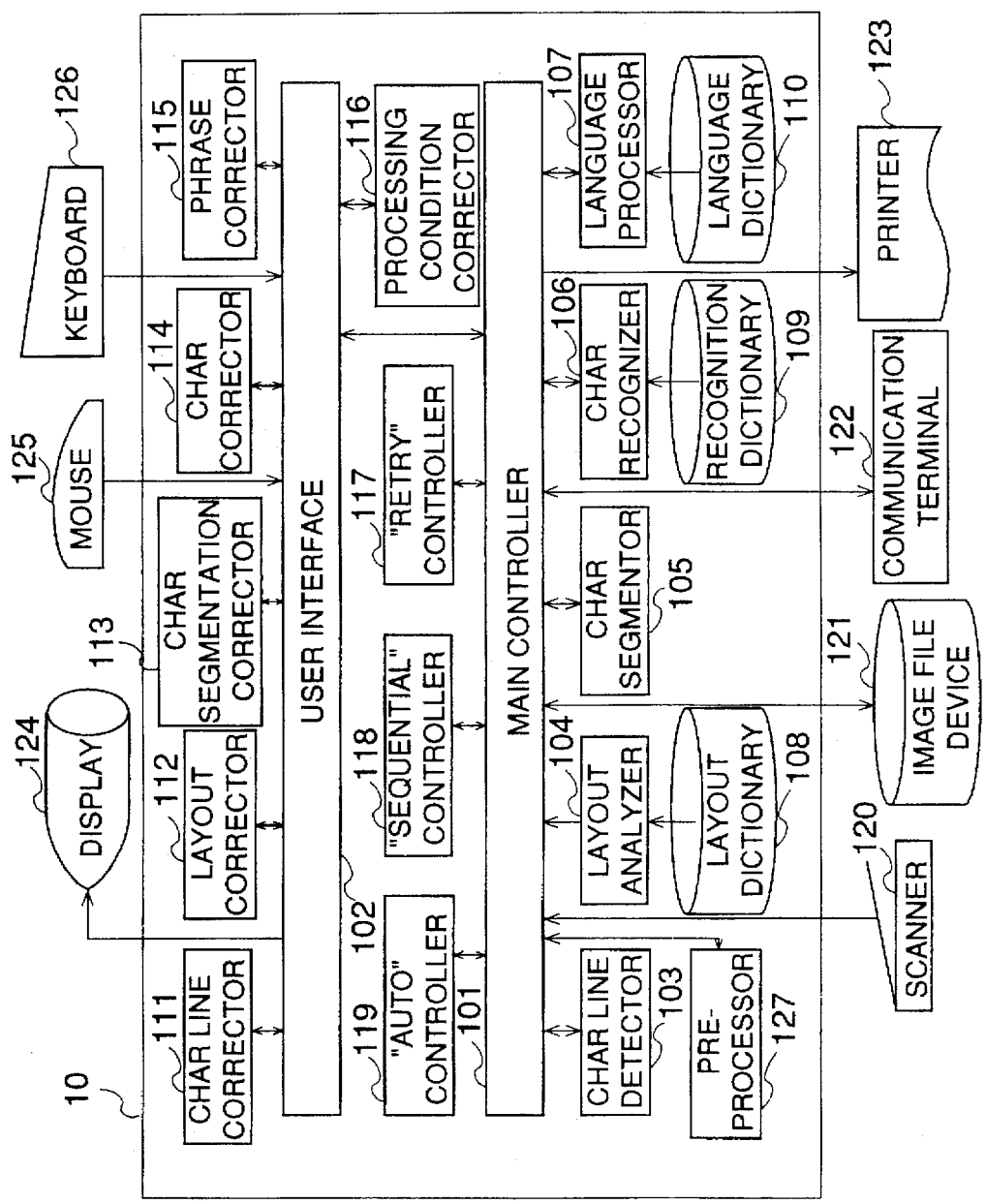
FIG. 1 is a diagram showing the architecture of a system for realizing the present invention.

FIG. 1 illustrates the architecture of a document recognition system for realizing the present invention.

The system proper system 10 includes various processing units for the document recognition system, and is chiefly implemented by software.

A main controller 101 controls input/output operations, recognition processing, etc. in the system. A user interface unit 102 manages the display of an image through a display unit 124, input operations through a mouse 125 and a keyboard 126, etc. A scanner 120, an image file device 121 and a communication terminal 122 are devices for entering document images.

A character line detector 103 receives area data which contain information on an area to-be-processed in the document image (such as the position information of the area), and it delivers character line data which contain information regarding character line in the area (such as the position information of the character line).

A layout analyzer 104 receives the area data as well as the character line data, it analyzes the layout of a document with reference to knowledge concerning the layout stored in a layout dictionary 108, and it delivers block data which contains coordinates indicating the positions of sets of character lines (character line blocks), the options (attributes) of the blocks and the reading sequence of the blocks. The reason why the reading sequence of the blocks is problematic, is that the recognized result of the document is obtained in the form of text data as character string. When recognized characters are merely displayed (or printed) at recognized positions, the analysis of the layout is not always necessary.

A character segmentor 105 receives the character line data, it derives character patterns from the pertinent character line, and it delivers the character patterns as character data.

A character recognizer 106 recognizes each character pattern of the character data with reference to the feature quantities of character patterns stored in a recognition dictionary 109, and it delivers a candidate character as a character code.

Details of the area data, block data, character line data and character data will be explained later in conjunction with FIG. 12.

A language processor 107 linguistically checks the character string obtained as the output of the character recognizer 106 and then corrects any error with reference to knowledge of words and grammar as stored in a language dictionary 110.

A character line corrector 111 serves to enter and correct the coordinates and options of the character line through the mouse 125 or the keyboard 126. Likewise, a layout corrector 112 serves to enter and correct the coordinates, options, reading sequence, etc. of the character line block through the mouse 125 or the keyboard 126.

A character segmentation corrector 113 serves to derive the character pattern from the character line and to correct the derived result through the mouse 125 or the keyboard 126.

A character corrector 114 serves to correct the output of the character recognizer 106 through the mouse 125 or the keyboard 126 by utilizing the recognized candidate characters obtained in the course of the character recognition processing. On this occasion, a character which is not based on the recognized candidates can also be entered using the keyboard 126 or the like.

A phrase corrector 115 serves to correct the output of the language processor 107 through the mouse 125 or the keyboard 126 by utilizing the recognized candidate character strings obtained in the course of the language processing. On this occasion, a character which is not based on the candidate character strings of the language processing can also be entered using the keyboard 126 or the like.

A processing condition corrector 116 serves to set and correct the area to-be-processed, scanner input ("scan image") conditions, recognition conditions, output conditions, etc. through the mouse 125 or the keyboard 126. The scanner input conditions include such input conditions as the resolution of a scanner, limits to-be-scanned and a reading gray level. The recognition conditions include such conditions as a character size, a character pitch, character sorts (handwritten or printed, and Japanese, symbols, numerals or English), a font type (serifed, non-serifed or "kyokasho" (school textbook) type), and vertical or lateral writing in the document to-be-recognized. The output conditions include such conditions as the presence or absence of a space output, the presence or absence of a new-paragraph output and an output file format (text, word processor or TEX). The format "TEX" is a kind of page descriptive language developed by Donald Knuth.

An "auto" (batch recognition) controller 119 functions to control a sequence for starting the respective processing when collectively executing the character line detection, layout analysis, character segmentation, character recognition and language processing. In addition, a "sequential" (sequential recognition) controller 118 functions to return to any desired processing and then continue the processing when executing the respective processing in step-by-step fashion and then making corrections if necessary. Besides, a "retry" (re-recognition) controller 117 functions to control a sequence for starting the processing when, after the result of the interim processing such as the character line detection or the character segmentation has been corrected by the character line corrector 111 or the character segmentation corrector 113, the steps of the other processing required for obtaining the recognized result are collectively executed.

A preprocessor 127 and a printer 123 are also included in the embodiment of the document recognition system shown in FIG. 1.

Figure 2:
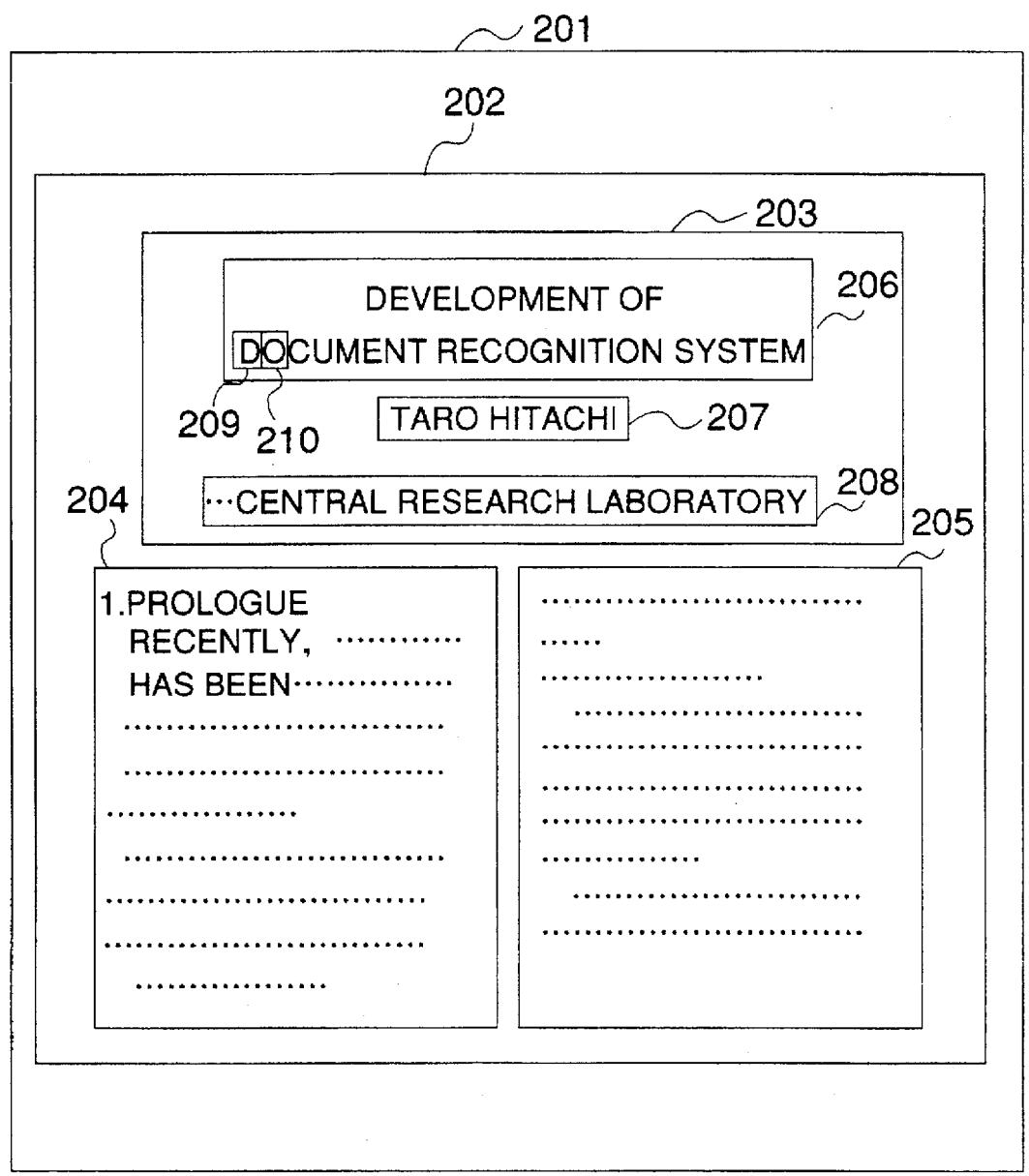
FIG. 2 is a diagram showing the relationships among an area, a block, a character line and a character.

FIG. 2 illustrates the relationships among an area, a block, a character line and a character on a document image. Numeral 202 indicates the area which is set as the object of the recognition processing in the document image 201. Numerals 203, 204 and 205 indicate the blocks in the area 202. The block 203 contains the character lines 206, 207 and 208. The character line 206 contains the characters 209 and 210. The limits of each area, each block, each character line and each character can be automatically detected by the document recognition system, and they can also be set by the operator of the system. In the case of the automatic detection, only one area is set for the whole sheet of the document.

Figure 3:
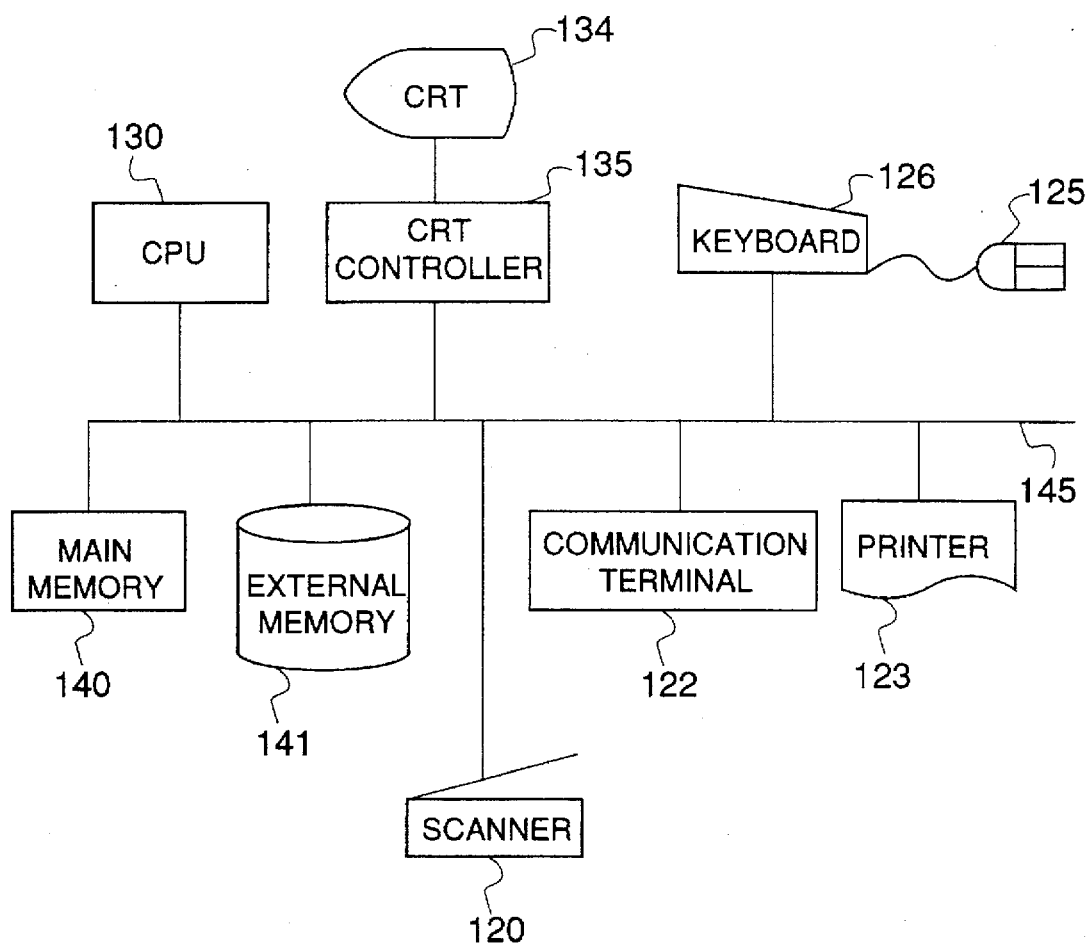
FIG. 3 is a diagram showing the hardware architecture of the system depicted in FIG. 1.

FIG. 3 illustrates an example of hardware architecture which realizes the system shown in FIG. 1. In FIG. 3, the same constituents as in FIG. 1 have the same reference numerals assigned thereto. A CPU (Central Processing Unit) 130 in FIG. 3 implements the various processing units of the system proper 10 in FIG. 1, in cooperation with programs stored in a main memory 140. A CRT 134 and a CRT controller 135 constitute the display unit 124 in FIG. 1. An external memory 141 constructs the image file device 121 in FIG. 1. Numeral 145 in FIG. 3 denotes a bus by which the constituents are interconnected.

Figure 4:
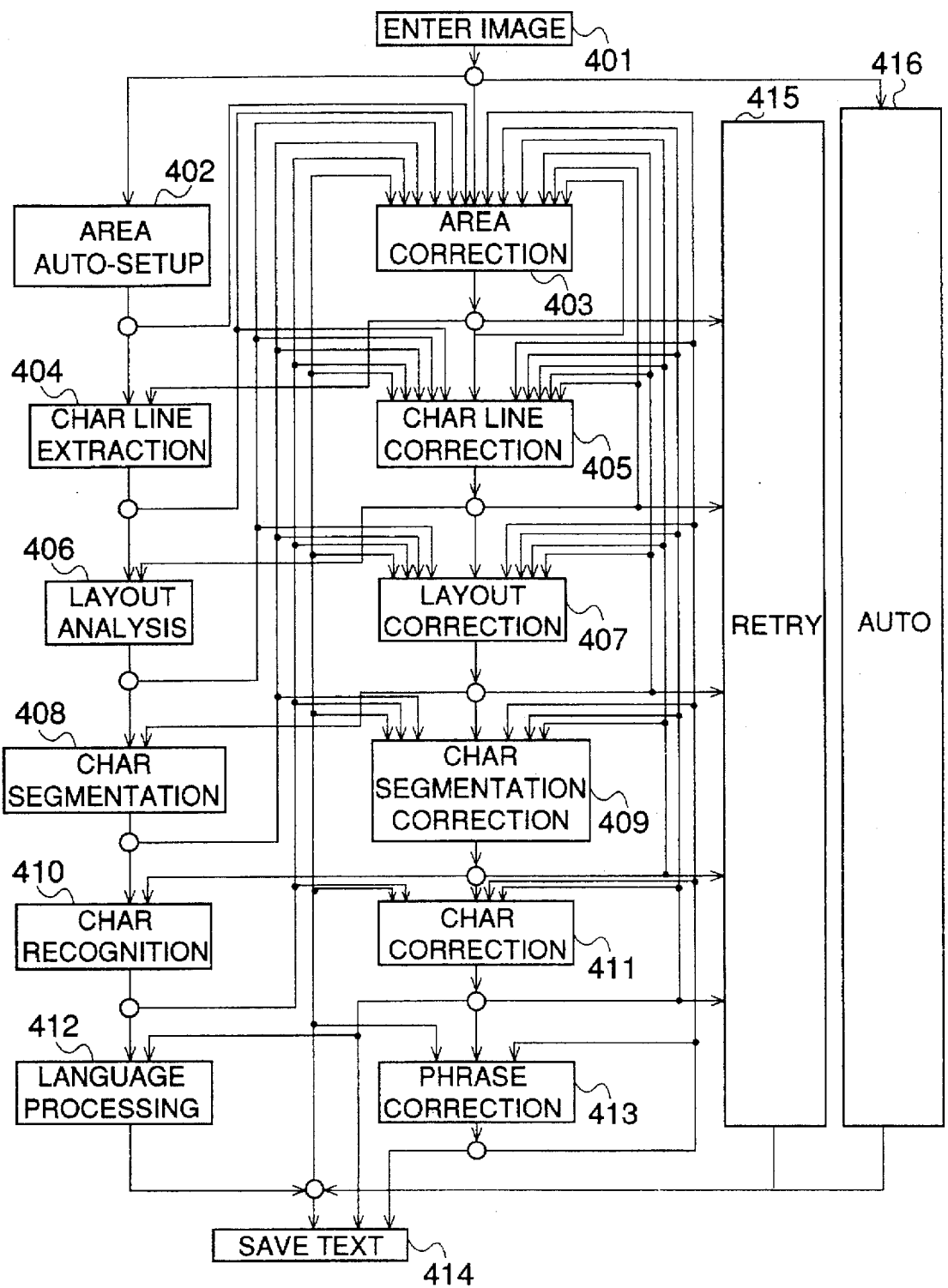
FIG. 4 is a chart showing the flow of processing in the present invention.

FIG. 4 illustrates an example of the flow of the processing in the document recognition system of this embodiment. Arrows in the figure denote a sequence in which the steps of the processing proceed. In addition, circles in the figure denote that the preceding processing steps are branched by the operations of the operator.

First, at the step 401, an image is entered by the image scanner or from the image file device such as an optical disk. Subsequently, the operator selects either the "sequential" control in which the document recognition is advanced while the processed results are being validated step by step, or the "auto" control in which the plurality of steps of processing are automatically executed in a predetermined sequence. In the case of the selection of the "sequential" control, the area of the image to be recognized is set. The area is automatically set at the step 402 in some cases, and is designated through the mouse or the like by the operator at the step 403 in the other cases. On this occasion, the options or attributes of the area to-be-processed, such as the distinction between vertical writing and lateral writing and the presence or absence of a drawing or table, are sometimes designated together.

After the area has been set or designated, the processing steps are usually executed in the order of the character line extraction at step 404, the layout analysis at step 406, the character segmentation step 408, the character recognition at step 410 and the language processing at step 412. It is also allowed to adopt a system in which the layout analysis is previously executed and in which the character line extraction is subsequently done in downward fashion, or a system which does not comprise any means for the language processing and which delivers the result of the character recognition as an output. The result of the language processing is displayed as the text, and is printed out as may be needed (step 414).

After the processing steps 402, 404, 406, 408, 410 and 412 have ended, the processed results of these steps are respectively presented to the operator so as to give him/her chances for detecting errors. Herein, the operator can make not only a correction for the last processing step executed most recently, but also a correction for any of the processing steps executed before. This measure permits the operator to cope with a situation where he/she has overlooked the error of the processed result at any of the steps executed before, and a situation where the cause of any error is not clear. In the example of FIG. 4, the correction processing steps consist of the area correction (step 403), character line correction (step 405), layout correction (step 407), character segmentation correction (step 409), character correction (step 411) and phrase correction (413). By way of example, when the error has been detected after the character recognition processing of the step 410, the document recognition can be executed again from the character correction (step 411). Besides, when the errors seem to have developed over several character strings because of the error of the character segmentation (step 408), the document recognition can be returned to the character segmentation correction (step 409). Therefore, the position of the error of the character segmentation having first occurred is corrected, whereupon the document recognition is shifted to the character recognition (step 410). Thus, errorless characters are automatically output without correction at step 411, whereby the other erroneous characters are corrected individually Since, in this manner, any of the recognition processing steps can be followed by the correction of any of the preceding steps, the flexibility of the correcting operation is enhanced, and the number of positions to be corrected can be reduced. Practicable examples of the individual correction processing will be explained later.

It is also possible to select the "retry" (re-recognition) processing (step 415) after each correction processing.

The recommended usage of this system is such that the "auto" (batch) recognition is first executed, that the desired correction processing is executed when any error has been found out as the result of the "auto" recognition, and that the "retry" processing is subsequently started. Of course, the "sequential" (stepped recognition) processing can be executed from the beginning.

The "retry" processing at step 415 is processing in which, after the completion of any of the correction processing, processing (to be explained later) necessary for obtaining the output text data is automatically decided and is executed by the system itself. It is also possible to execute the "auto" (batch recognition) processing (step 416) subsequently to the image input processing (step 401). The "auto" processing at step 416 is processing in which the steps of processing necessary for obtaining the output text data and the steps of correction processing registered beforehand as may be needed are automatically executed in succession.

Figure 5:
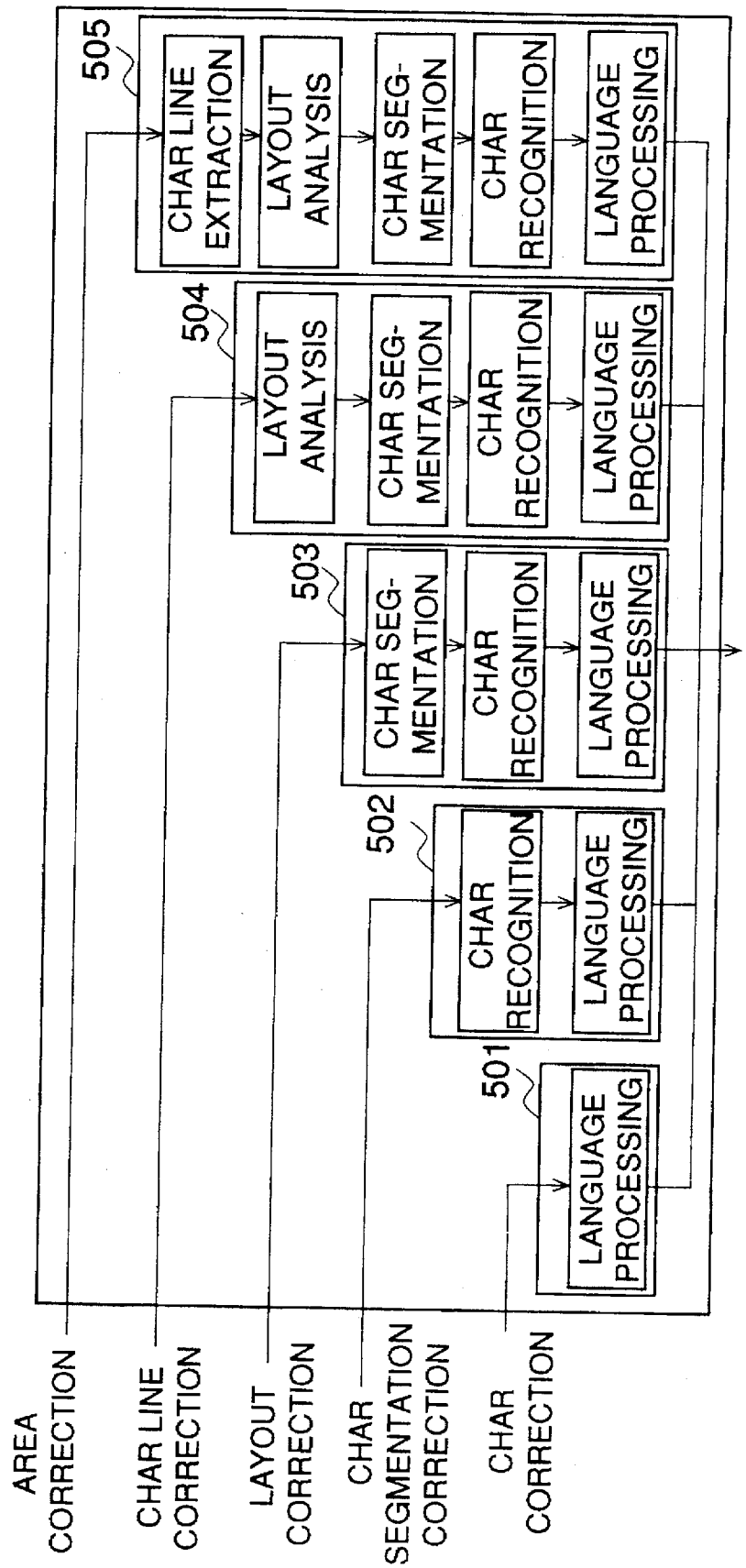
FIG. 5 is a chart showing the flow of "retry" (re-recognition) processing.

FIG. 5 illustrates the flow of the "retry" (re-recognition) processing (step 415). At step 415, any of the flows of processing at steps 501, 502, 503, 504 and 505 is started in accordance with a state which is assumed immediately before the start of the re-recognition. That is, the processing of the step (or steps) succeeding the recognition processing step (402, 406, 408 or 410) to which the pertinent correction is directed is (or are successively) started. By way of example, when the re-recognition has been started subsequently to the character line correction, the processing flow 504 is started to execute the processing steps in the order of the layout analysis, character segmentation, character recognition and language processing.

Figure 6:
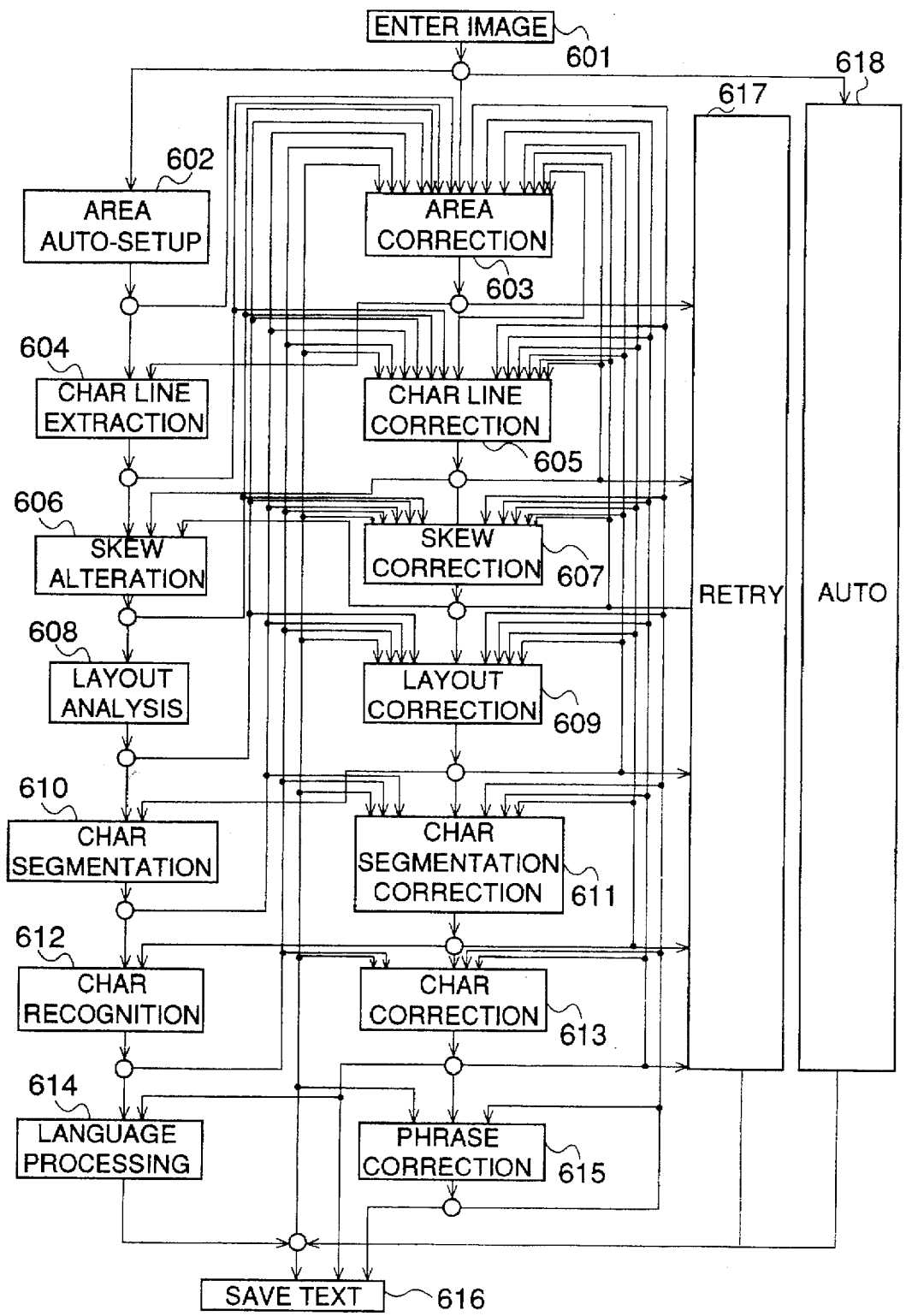
FIG. 6 is a chart showing another example of the flow of processing in the present invention.

FIG. 6 illustrates an processing in the preslow of processing in the present invention. In this example, area auto-setup (step 602) and character line extraction (step 604) are first executed. Subsequently, the skew of an image entered at step 601 is altered by "rotate image" (image rotation) processing at step 606 on the basis of the skew of an extracted character line. Thereafter, a layout analysis (step 608), character segmentation (step 610), character recognition (step 612) and language processing (step 614) are executed. Further, the steps of area correction 603, character line correction 605, skew correction 607, layout correction 609, character segmentation correction 611, character correction 613 and phrase correction 615 can be started in accordance with the respectively corresponding instructions of the operator. The image rotation processing is one of the functions of the preprocessor 127 in FIG. 1. Accordingly, it is understood that the skew "alteration" at step 606 is automatically started by the document recognition system, whereas the skew "correction" at step 607 is executed subject to the operator's instruction. The rotation of the image to an appropriate angle facilitates the succeeding processing. When the skew correction (step 607) has been executed, the skew alteration (step 606) is executed on the basis of a skew designated anew, and the other processing steps are thereafter executed.

In the same manner as in the example of FIG. 4, it is possible that, after the correction processing of each of the steps of the area correction 603, character line correction 605, skew correction 607, layout correction 609, character segmentation correction 611, character correction 613 and phrase correction 615 has been executed, the respective processing steps of the character line extraction 604, layout analysis 608, skew alteration 606, character segmentation 610, character recognition 612 and language processing 614, et seq., or the other correction processing steps are successively executed in accordance with the instruction of the operator. It is also possible to execute the "retry" (re-recognition) processing (step 617) after the execution of the correction processing. The "retry" processing at step 617 is processing in which, after the completion of any of the correction processing, processing (to be explained later) necessary for obtaining the output text data is automatically decided and is executed by the system itself.

As in the example of FIG. 4, it is possible to execute the "auto" (batch recognition) processing (step 618) subsequently to the image input processing (step 601). The "auto" processing at step 618 is processing in which the steps of processing necessary for obtaining the output text data and the steps of correction processing registered beforehand as may be needed are automatically executed in succession.

Numeral 616 in FIG. 6 indicates text output processing.

Figure 7:
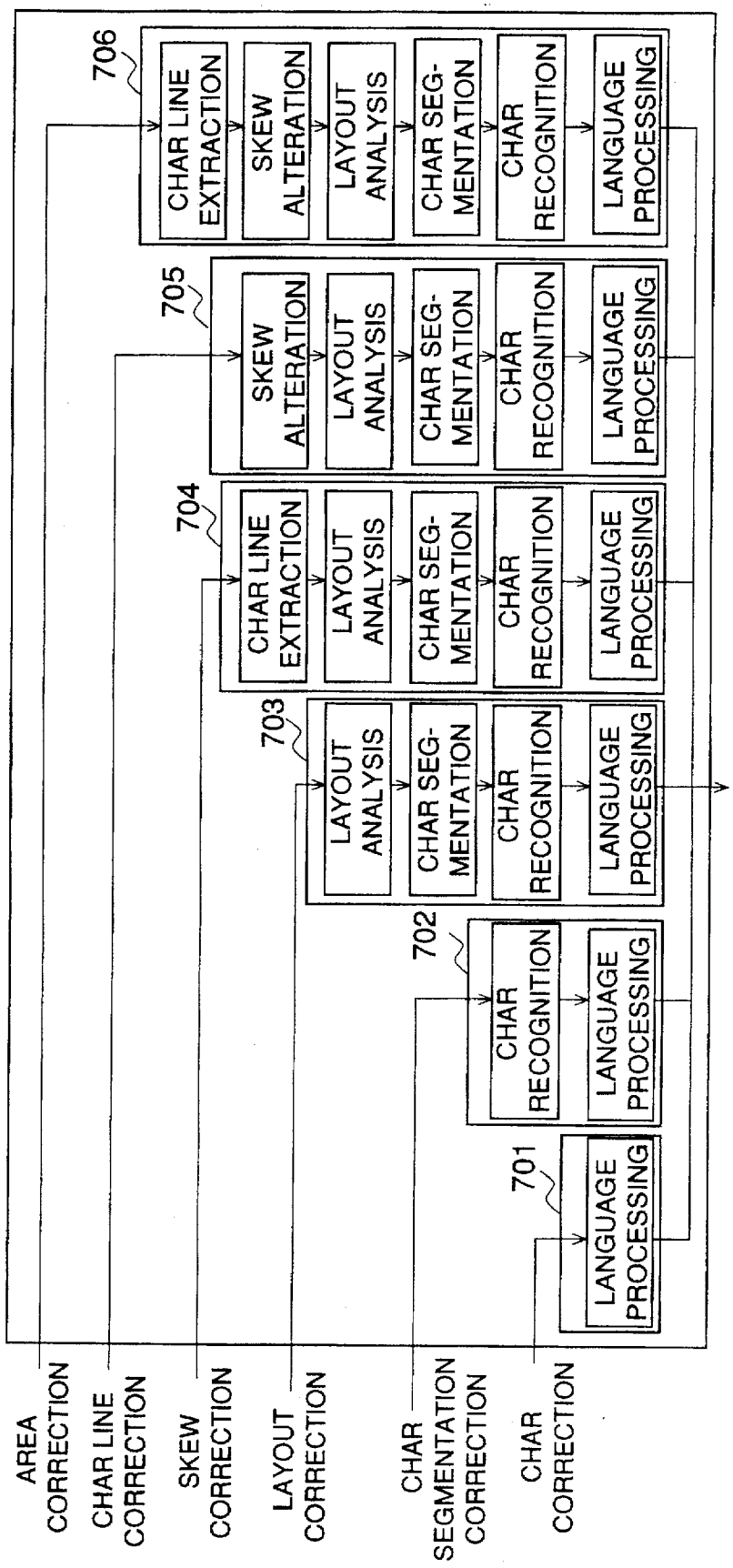
FIG. 7 is a chart showing the flow of "retry" processing (re-recognition processing) in the example of FIG. 6.

FIG. 7 illustrates the flow of the "retry" (re-recognition) processing 617 in the example of FIG. 6. Herein, any of the flows of processing at steps 701, 702, 703, 704, 705 and 706 is started in accordance with a state which is assumed immediately before the start of the re-recognition. By way of example, when the re-recognition has been started subsequent to the character line correction, the processing flow 705 is started to execute the processing steps in the order of the skew alteration, layout analysis, character segmentation, character recognition and language processing. Besides, when the re-recognition has been started subsequent to the skew correction, the processing flow 704 is started to execute the processing steps in the order of the character line extraction, layout analysis, character segmentation, character recognition and language processing.

It is to be noted that the processing flow 704 subsequent to the skew correction in the "retry" processing of FIG. 7 is different from the "sequential" processing shown in FIG. 6. More specifically, in the "sequential" processing in FIG. 6, the skew correction (step 607) is not shifted to the character line extraction (step 604), but it is shifted to the skew alteration (step 606). On the other hand, according to the processing flow 704 in FIG. 7, the skew correction is followed by the character line extraction, which proceeds to the layout analysis without the execution of the skew alteration. In the "retry" processing of FIG. 7, a case is supposed where the skew correction is instructed by the operator on account of the error of the character line extraction. In this way, the document recognition system is informed of the correct skew of the character line so as to subsequently execute the steps of the layout analysis et seq. without rotating the image.

However, the processing flows in FIG. 7 indicate a mere example of the "retry" processing (617 in FIG. 6), and the present invention is not restricted thereto. The contents of the processing subsequent to each of the correction steps can be set at will by settings in a control table (FIG. 8) which is explained below.

FIG. 8 exemplifies the table which controls the starts of the steps of the "retry" processing 617 in the example of FIG. 6. Items in rows denote the correction processing steps which directly precede the steps of the "retry" processing, while items in columns denote the processing steps which are to be started by the "retry" processing. Circles depicted on the right sides of the names of the correction processing steps signify that steps of the columns corresponding to the circles are respectively executed subsequently to the correction processing steps. By way of example, when the "retry" processing succeeds the skew correction, the system executes the steps of the character line extraction, layout analysis, character segmentation, character recognition and language processing, which are indicated by the circles on the right side of the skew correction in the table (this corresponds to the processing flow 704 in FIG. 7). Although a control table for the "retry" processing 415 in the example of FIG. 4 is not especially illustrated, it will be obvious to those skilled in the art that such a control table is similar to the table shown in FIG. 8.

FIG. 9 illustrates another example of the table which controls the steps of the "retry" processing. In this example, the system can execute besides the processing steps in FIG. 6, the processing steps of "format input" for entering the layout, options etc. of a document into a file, "file input" for entering an image from the file, "scanner input" for entering an image from a scanner, "scanner setup" for designating the operating conditions of the scanner, "area option setup" for designating the options of a designated area to-be-processed such as a type, character lines, characters and a character direction, "noise filtering" for eliminating noise in a document image by the use of an image processing technique such as isolated point removal, "halftone dot elimination" for eliminating the dots of halftone printing in a document, and "document direction discrimination" for discriminating the vertical or horizontal direction of a document. These steps are the functions of the processing condition corrector 116 and the preprocessor 127 shown in FIG. 1. Further, the document direction at step "document direction discrimination" shall be discriminated from the coordinates of an extracted character line. In this example, the table is used for managing such restrictions that, after the option of the character line of the area has been altered, a character line needs to be extracted again, and that, after the character line correction has been made, the document direction needs to be discriminated again. The items of the character line correction, the skew correction etc. are contained as the steps to be executed subsequently to the correction processing steps in FIG. 9. This is intended to give the operator chances to check and correct processed results, even in the "retry" (re-recognition) processing. Of course, such correction steps are not indispensable.

Figure 10:
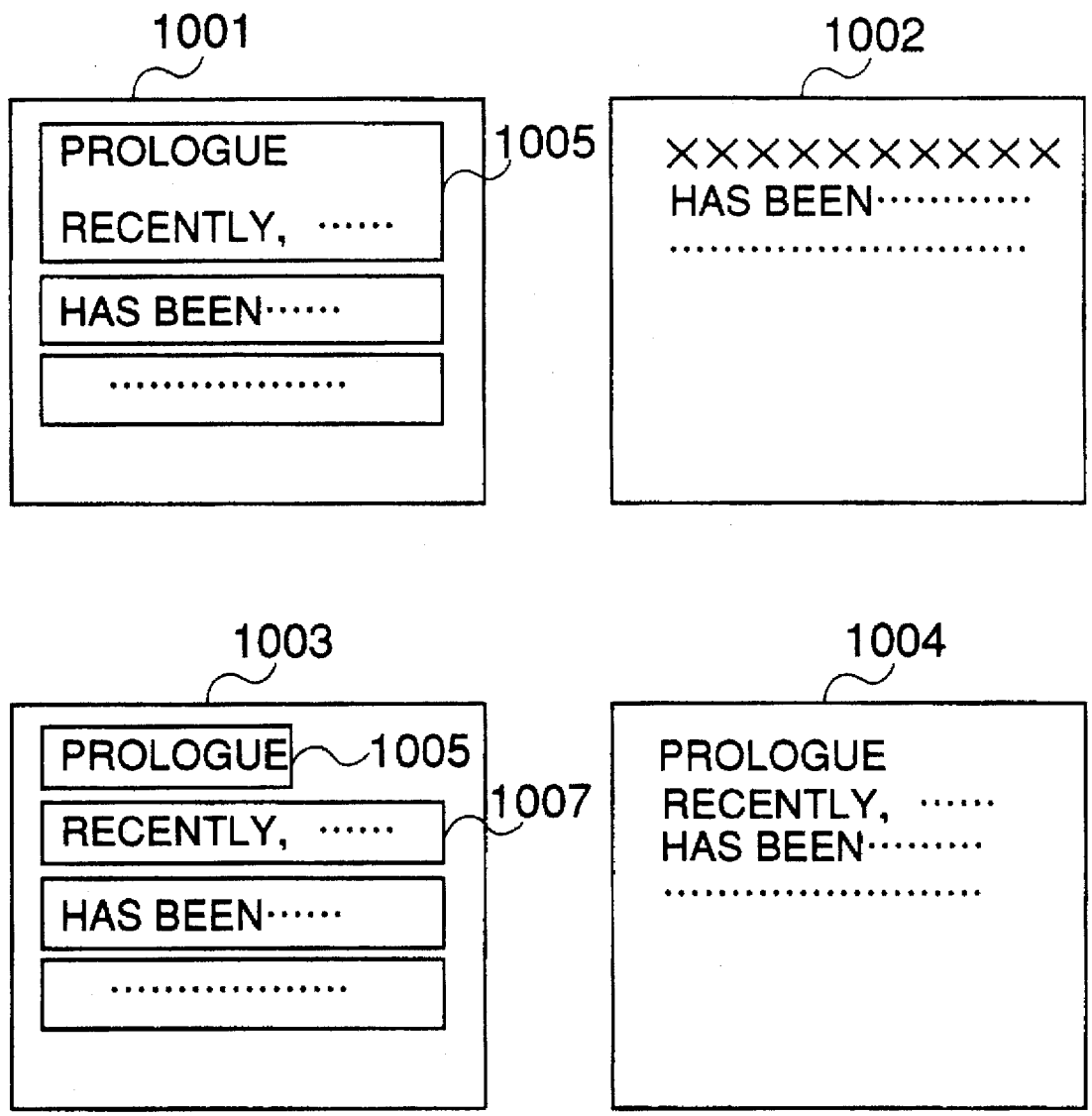
FIG. 10 is a diagram showing an example of the operation of re-recognition.

FIG. 10 illustrates an example of the "retry" (re-recognition) processing after the character line correction. Smaller rectangles included in larger rectangles 1001 and 1003 indicate the extracted results of character lines. Numerals 1002 and 1004 denote character recognition results which correspond to the character line extraction results 1001 and 1003, respectively. In the character line extraction results 1001, the extracted character line 1005 is erroneous, so that unread characters indicated by marks "X" are successive in the recognized result 1002. Here, a correct recognition result as indicated by the character recognition result 1004 is obtained in such a way that the character line 1005 is segmented and corrected into the character lines 1006 and 1007 included in the character line extraction results 1003, that character patterns are derived again on the basis of the correct character lines 1006 and 1007 so as to recognize characters, and that the result of the character recognition is substituted for the recognized result corresponding to the character line 1005 in the recognized result 1002. Owing to the substitution, the recognition processing need not be iterated over the whole document, and the efficiency of the document recognition job can be increased.

Incidentally, the Japanese document in which "kana" (the Japanese syllabary) and "kanjis" (Chinese characters used in Japanese writing) coexist has been mentioned as an object to-be-recognized in the example of FIG. 10, but the recognition of English or any other language can be similarly executed. The same applies to the ensuing description.

Figure 11:
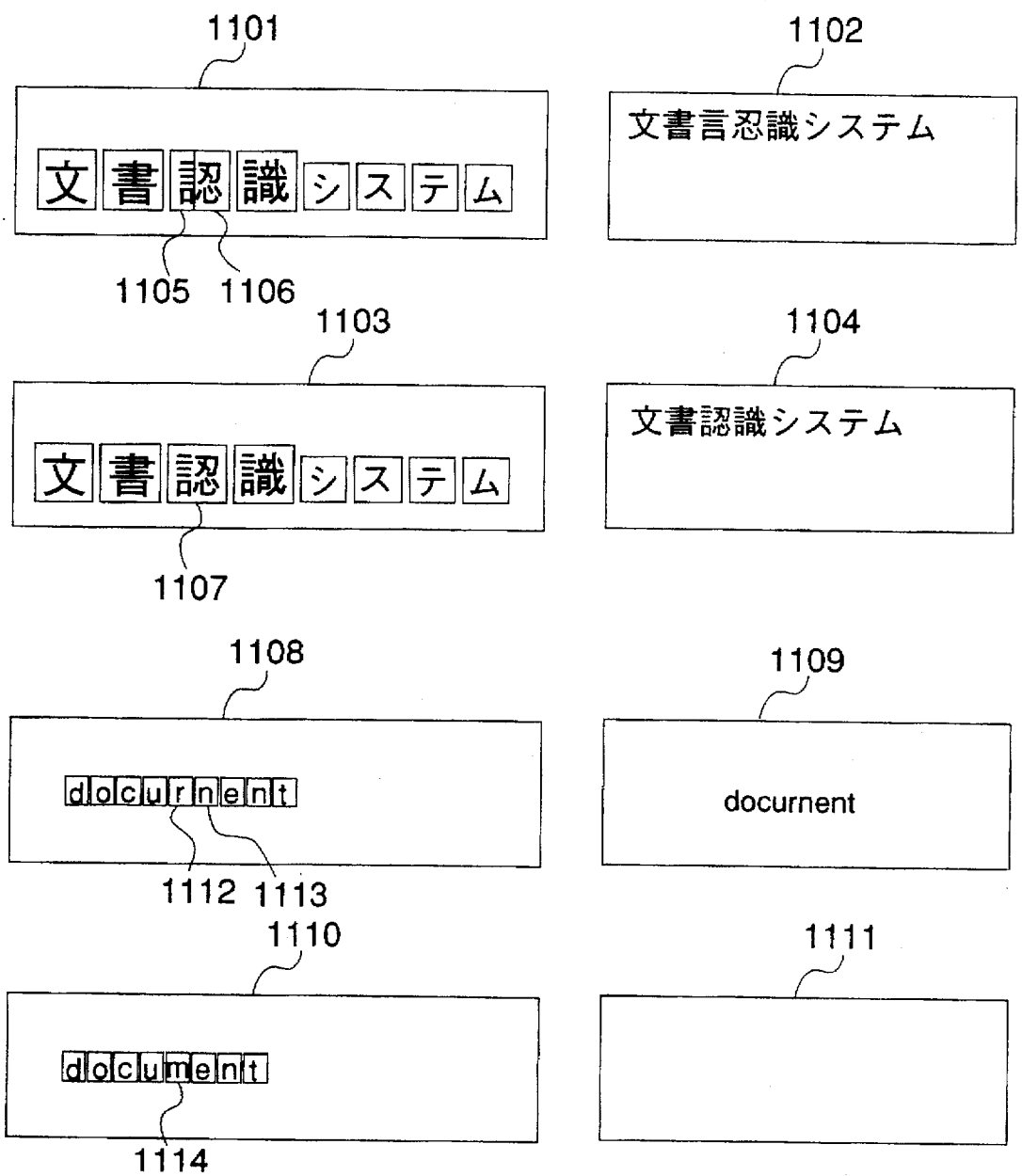
FIG. 11 is a diagram showing another example of the operation of the re-recognition.

FIG. 11 illustrates an example of the "retry" (re-recognition) processing after the character segmentation correction. Smaller rectangles included in larger rectangles 1101, 1103, 1108 and 1110 indicate the derived results of character patterns (character segmentation result). Numerals 1102, 1104, 1109 and 1111 denote character recognition results which correspond to the character pattern derivation results 1101, 1103, 1108 and 1110, respectively.

The character segmentation result 1101 exemplifies a case where two elements constituting one "kanji" (Chinese character) are respectively recognized as different independent "kanjis" (Chinese characters). More specifically, the derived character patterns 1105 and 1106 are erroneous in the character segmentation. In the recognized result 1102, therefore, a character " 置 " is erroneously presented as characters " 罒 " and " 直 ". Here, a correct recognition result as indicated by the character recognition result 1104 is obtained in such a way that the character patterns 1105 and 1106 are corrected into the character pattern 1107 included in the character segmentation result 1103, that the character recognition is executed on the basis of the correct character pattern 1107, and that the result of the character recognition is substituted for the recognized results corresponding to the character patterns 1105 and 1106 in the character recognition result 1102. Owing to the substitution, the recognition processing need not be iterated over the whole document, and the efficiency of the document recognition job can be heightened.

Likewise, in the character segmentation result 1108, the letter "m" is erroneously segmented into the two character patterns 1112 and 1113, and it is accordingly recognized as two letters "rn" (1109). The correct recognition result is obtained (1111) through the character segmentation correction (1114).

Figure 12:
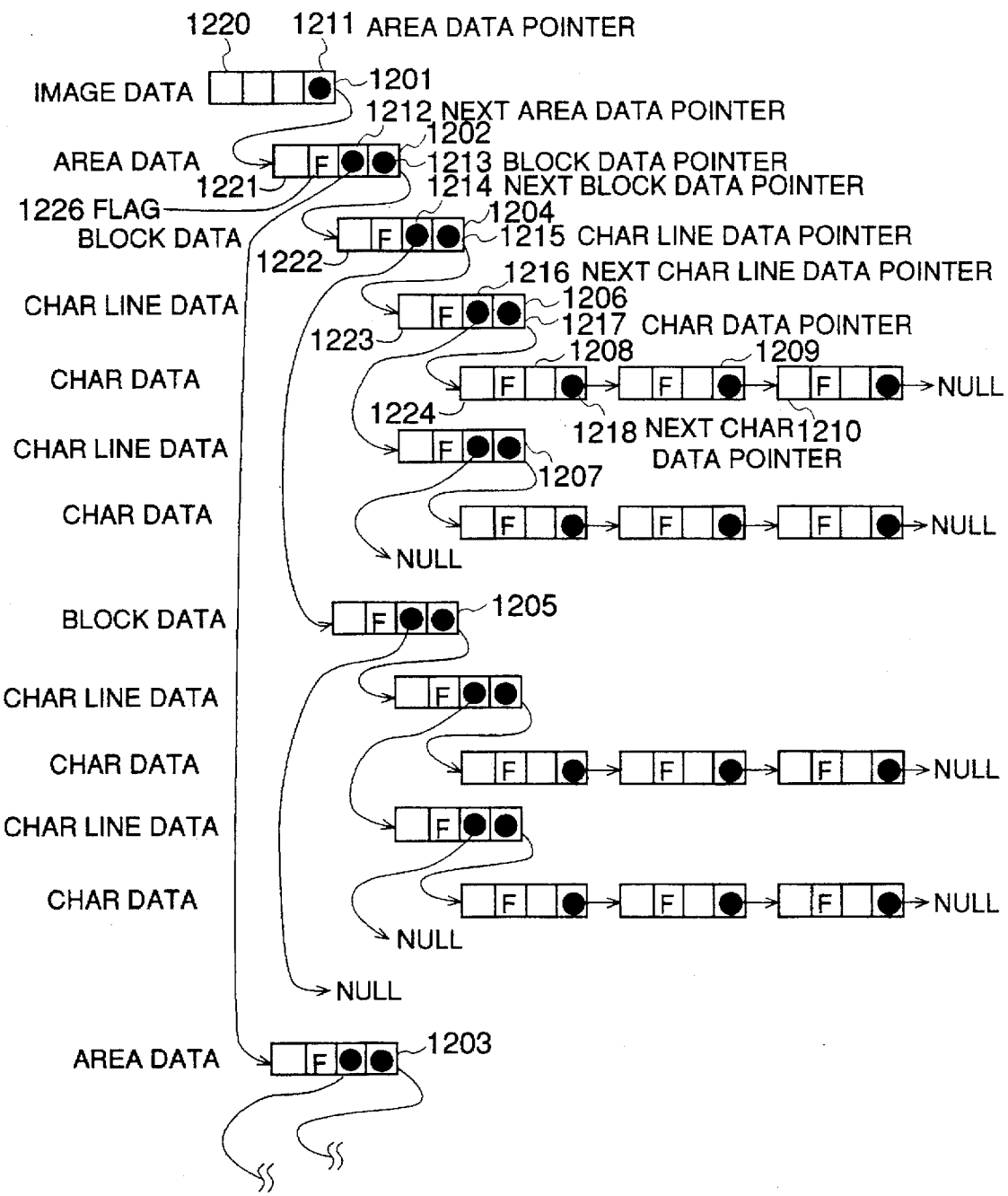
FIG. 12 is a diagram showing a data format for use in the present invention.

FIG. 12 illustrates a data format for use in the present invention. Data assume a hierarchical tree structure which conforms to the order of image data 1201, area data 1202 and 1203, block data 1204 and 1205, character line data 1206 and 1207, and character data 1208, 1209 and 1210.

Information items 1220 on the scanning conditions of a document image, etc. are contained in the image data 1201.

An area data pointer 1211 is also contained in the image data 1201. The area data pointer 1211 is for referring to the area data (for example, the area data 1202 within the image).

The area data 1202 contains information items 1221 on the positional coordinates, options (namely, attributes) etc. of an area designated within the image. It also contains a next-area data pointer 1212. The next-area data pointer 1212 is a pointer for referring to area data other than the pertinent area data 1202 which corresponds to an area designated within the image. By way of example, the next-area data pointer 1212 serves for referring to the other area data 1203. In general, a plurality of area data designated within the image are referred to in the form of a chain by the use of next-area data pointers. A null value (usually, specific values are stipulated as null values, depending upon systems) is previously contained in the next-area data pointer of the area data at the tail of the chain, whereby the tail is identified.

The area data also contains a block data pointer. The block data pointer is a pointer for referring to the block data. By way of example, an illustrated block data pointer 1213 contained in the area data 1202 serves for referring to the block data 1204.

The block data 1204 contains information items 1222 on the positional coordinates, options, reading sequence etc. of blocks, each of which is a set of character lines as columns or the like included within the area. It also contains a next-block data pointer 1214. The next-block data pointer 1214 serves for referring to that block data 1205 other than the pertinent block data which corresponds to a block designated within the image. In general, a plurality of block data within the area are referred to in the form of a chain by the use of next-block data pointers, and the null value is contained in the next-block data pointer of the block data at the tail of the chain.

The block data 1204 also contains a character line data pointer 1215. The character line data pointer 1215 serves for referring to the character line data 1206.

Each of the character line data 1206 etc. contains information items 1223 on the positional coordinates, options etc. of a character line within the pertinent block. The character line data 1206 also contains a next-character-line data pointer 1216. The next-character-line data pointer 1216 serves for referring to that character line data 1207 other than the pertinent character line data which corresponds to a character line designated within the pertinent block. In general, a plurality of character line data within the block are referred to in the form of a chain by the use of next-character-line data pointers, and the null value is contained in the next-character-line data pointer of the character line data at the tail of the chain.

The character line data 1206 also contains a character data pointer 1217. The character data pointer 1217 is a pointer for referring to the character data 1208.

Each of the character data 1208 etc. contains information items 1224 on the positional coordinates, options, recognized result etc. of a character within the pertinent character line. The character data 1208 also contains a next-character data pointer 1218. The next-character data pointer 1218 is a pointer for referring to that character data 1209 other than the pertinent character data which corresponds to a character designated within the pertinent character line. In general, a plurality of character data within the character line are referred to in the form of a chain by the use of next-character data pointers, and the null value is contained in the next-character data pointer of the character data at the tail of the chain.

A "retry" (re-recognition) flag F is contained in each of the area data, block data, character line data and character data mentioned above (the flag F is indicated by numeral 1226 for only the area data 1202). The "retry" flag F has a value "1" when the pertinent data has been corrected by the correction processing, or when any of the data on the tail side with respect to the pertinent data has not been generated. On the other hand, it has a value "0" when the data on the tail side with respect to the pertinent data has already been generated and where the pertinent data has not been corrected. When the re-recognition has been started, the processing steps are executed for the data items whose "retry" flags F have the value "1", in conformity with the table (in FIG. 8 or FIG. 9) which controls the re-recognition. Due to this contrivance, only the data items which are affected by the correction are subjected to the re-recognition, so that the period of time for the recognition processing can be shortened. If the correctional data (former data) is the block data, the data "on the tail side" (latter data) includes all of the data within the pertinent block data; if the former data is the character line data, the latter data includes all of the data within the pertinent character line data; and if the former data is the character data, the latter data includes the succeeding character data within the character line data to which the pertinent character data belongs. For the character correction, however, even when the correctional data is the character data, the data "on the tail side" includes all of the character line data to which the pertinent character data belongs. The "retry" flag F need not be set at "1" for such correction processing as the mere replacement of the blocks in the sequence thereof.

Figure 13:
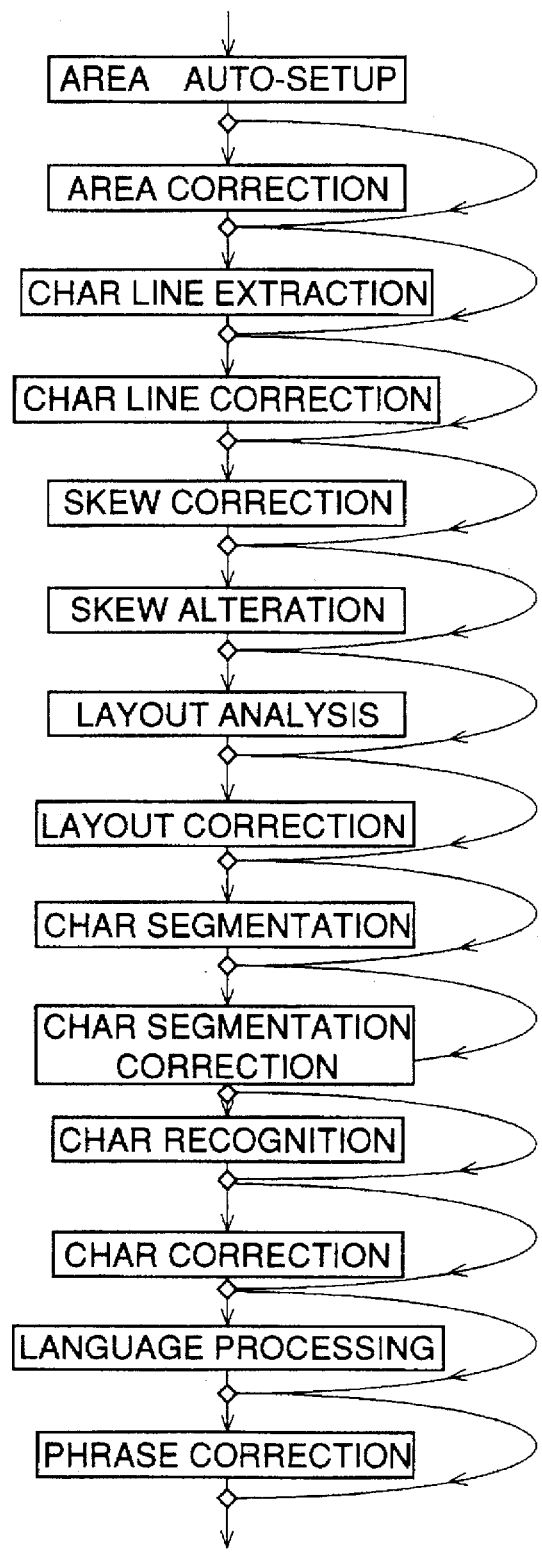
FIG. 13 is a chart showing the flow of "auto" processing (batch processing) in the example of FIG. 6.

FIG. 13 illustrates the flow of the "auto" (batch recognition) processing 618 in the example of FIG. 6. Circles in FIG. 13 indicate that the processing is branched by the "auto" controller 119 shown in FIG. 1. How to branch the processing is designated beforehand by the operator of the document recognition system. The "auto" controller 119 starts the area auto-setup, character line extraction, skew alteration, layout analysis, character segmentation, character recognition and language processing in a sequence which is required for obtaining the text codes of a recognized result. The processing steps which are not always necessary, such as the skew alteration and language processing, can be omitted in conformity with the contents designated beforehand by the operator. Besides, the correction processing steps in which the operator intervenes, such as the area correction, character line correction, skew correction, layout correction, character segmentation correction, character correction and phrase correction, can be started in conformity with the contents designated beforehand by the operator.

FIG. 14 illustrates a table for controlling the "auto" (batch recognition) processing 618 in the example of FIG. 6. Values in columns 1401, 1402 and 1403 within the table are determined beforehand by the system, while values in column 1404 are designated on occasion by the operator.

The values stored in column 1401 are "id" values as the identifiers of the respective processing steps. Execution designation flags which express the designations of the operator as to whether or not the pertinent processing steps are to be executed, are stored in column 1404 within the table. The processing steps whose execution designation flags have the values "0", are omitted by the branches in the flow chart of FIG. 13. Indispensable-step flags which express whether or not the pertinent processing steps are omissible, are stored in column 1402 within the table. When the values of the indispensable-step flags are "1", the pertinent processing steps are indispensable, whereas when the values are "0", the steps are omissible. The values stored in the column 1403 within the table are equivalent-step values which express whether or not the pertinent processing steps can be substituted by any other processing steps though they are indispensable. When two or more processing steps have the same equivalent-step values and where any of these processing steps has the value "0" as the execution designation flag (in the column 1404) in spite of being indispensable, the "auto" controller 119 controls the processing flow so as to start the one processing step which is stored in the uppermost part within the table.

Figure 15:
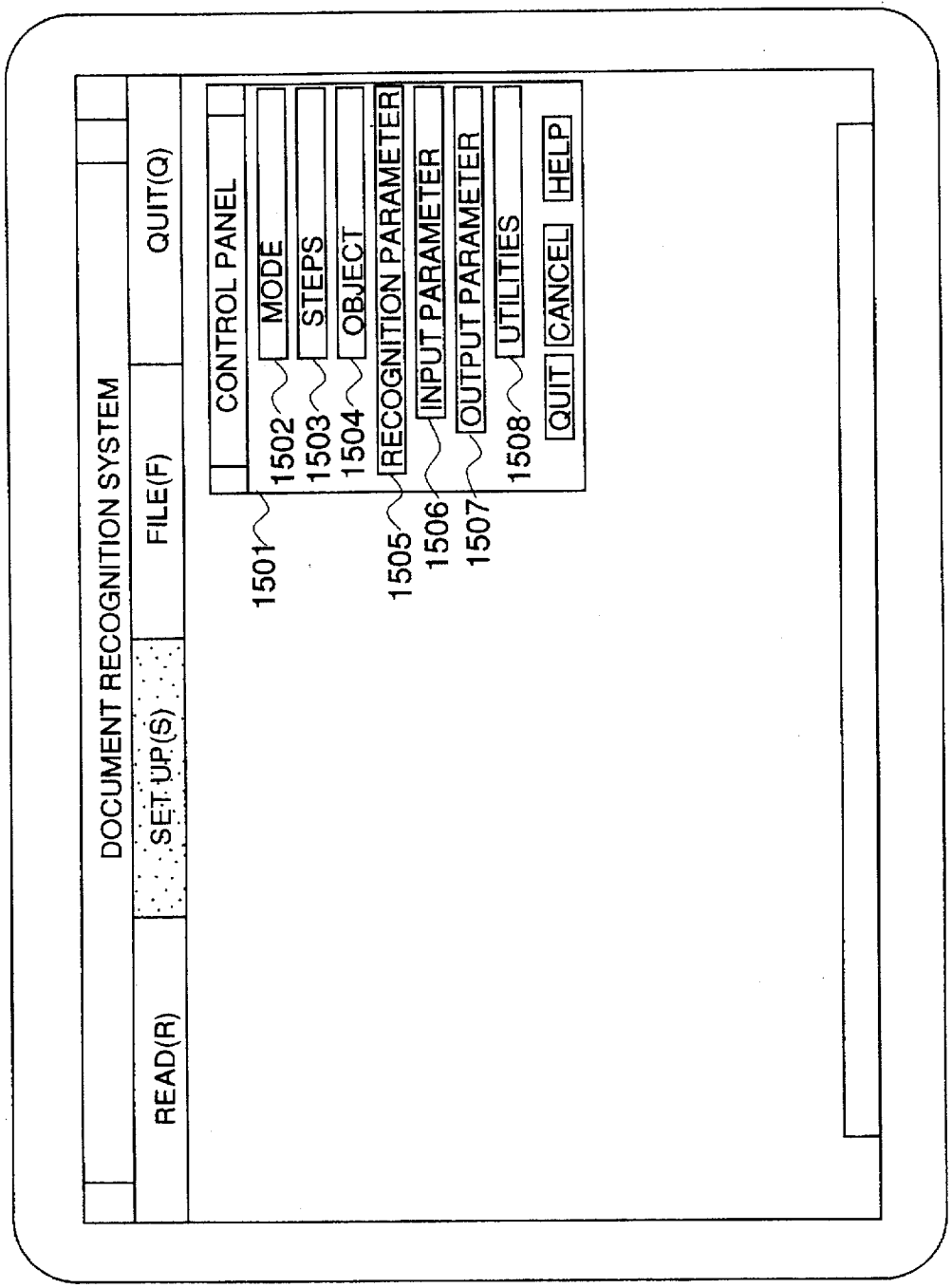
FIG. 15 is a diagram showing a screen for starting document recognition.

FIG. 15 illustrates an example of a display screen (display image) in the document recognition system shown in FIG. 1. The screen is for starting the document recognition. Buttons (touch switches) 1502, 1503, 1504, 1505, 1506, 1507 and 1508 which are arranged on a control panel 1501 displayed on the screen are clicked by a mouse cursor, whereby the respectively corresponding steps are started. The control panel 1501 may well be replaced with a pull-down menu, a pop-up menu or the like.

The button 1502 is a processing mode setting button for invoking a control screen which serves for the change-over between processing modes for the file input and for the scanner input. The button 1503 is a steps (procedure or flow) setting button for invoking a screen which serves for setting the processing steps in the "auto" (batch recognition) processing. The button 1504 is an object (processing unit) setting button for invoking a screen which serves for setting whether the document is recognized in page units or is continuously recognized using an automatic original conveyor or the like.

The button 1505 is a recognition parameter setting button for invoking a screen which serves for setting parameters usable for recognition, such as a character size, character sorts, a font type, a character pitch, a line pitch and vertical or lateral writing. The button 1506 is an input parameter setting button for invoking a screen which serves for setting parameters necessary for entering the image, such as the resolution of the scanner and the threshold value of binarization (which is processing for turning an input value into a binary value). The button 1507 is an output parameter setting button for invoking a screen which serves for setting parameters necessary for delivering the recognized result, such as the distinction between the full size and half size of a character, the output format of a space and the output format of a new paragraph. The button 1508 is a utility (auxiliary function) setting button for invoking a screen which serves for controlling the "sequential" processing (step-by-step recognition) and the "retry" processing (re-recognition).

Figure 16:
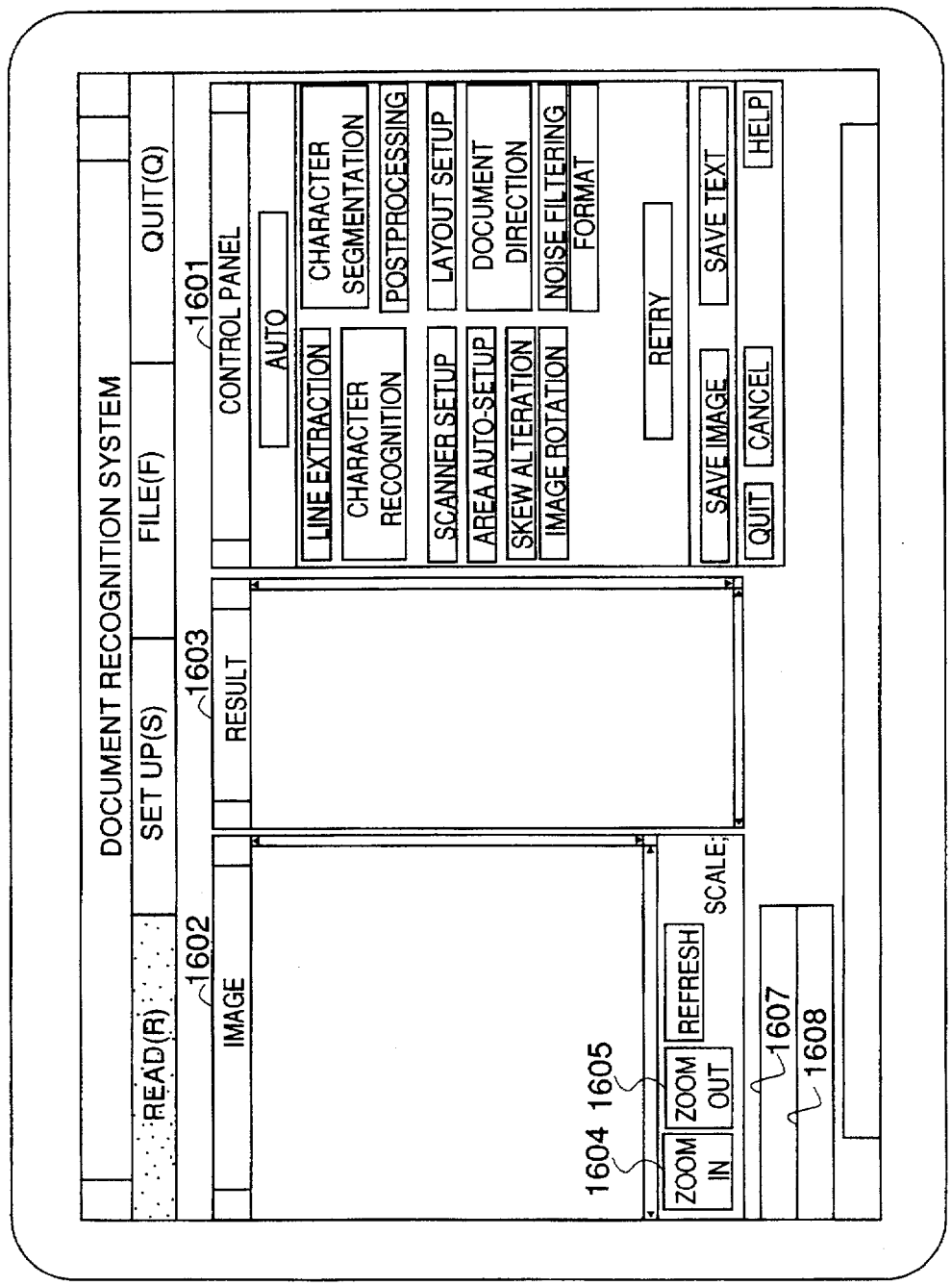
FIG. 16 is a diagram showing a screen for performing recognition and correction operations.

FIG. 16 illustrates an example of the document recognition control screen. This screen is opened by clicking a menu "Read" at the left upper part of the screen shown in FIG. 15. A control panel 1601 located at the right end of the screen shown in FIG. 16 includes, not only buttons for the "auto" processing and "retry" processing, but also buttons for the individual steps for the "sequential" processing, for example, the steps "character line extraction", "character segmentation", "character recognition" and "postprocessing (language processing)". For the brevity of the illustration, all of the steps in FIG. 6 are not shown in FIG. 16. For the "sequential" processing, the clicks of only the steps which are executable at the current point of time become effective. Information regarding which stop can be currently selected, is presented to the operator in such a way that the buttons which cannot be selected have their display intensities lowered.

Numeral 1602 indicates a window for displaying the image entered as an input. Buttons 1604 and 1605 serve to start processing steps for zooming in (expanding) and zooming out (reducing) the displayed image, respectively. Numeral 1603 indicates a window for displaying the text data of the recognized result. It is also allowed that an edit function can be executed within the window 1603. A window 1607 displays a part corresponding to one line of the image, on an enlarged scale. Another window 1608 displays the text of the recognized result of the part displayed in the window 1607, in correspondence with the individual characters.

Figure 17:
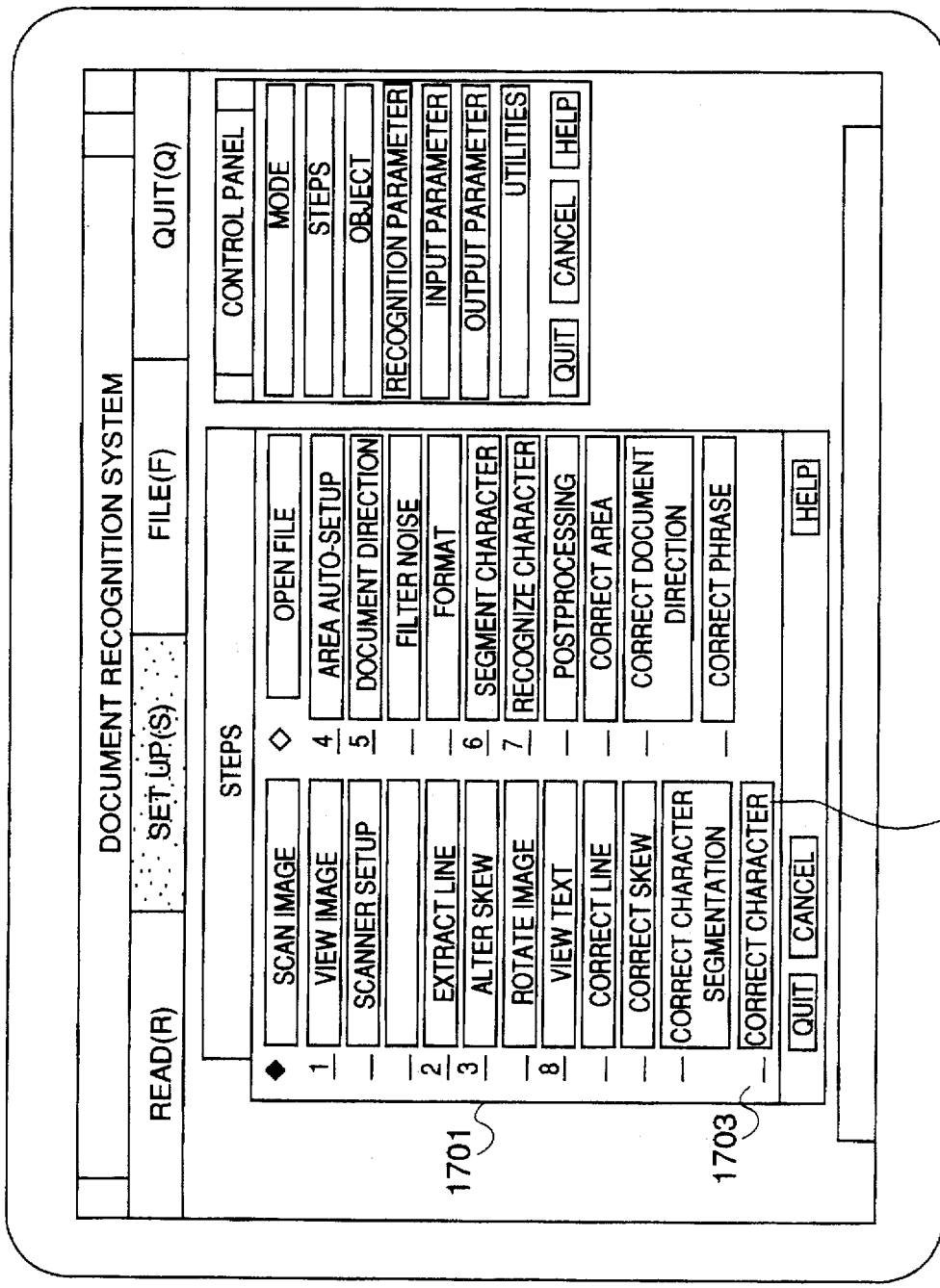
FIG. 17 is a diagram showing a screen for entering the values of execution designating flags in the "auto" processing control table.

FIG. 17 illustrates an example of the display screen for setting the processing steps (procedure). This screen serves to enter the values of the execution designation flags into the table for controlling the "auto" processing (FIG. 14). It is displayed by clicking the "auto" button in the control panel 1601 shown in FIG. 16.

Buttons (1703, etc.) expressive of the identifiers of the processing steps are arranged on a steps (procedure) setting control panel 1701 contained in the screen. The control panel 1701 may well be replaced with a pull-down menu, a pop-up menu or the like. The value of the execution designation flag of the processing step which corresponds to the identifier indicated on each of the buttons, can be alternately changed into "1" and "0" by clicking the pertinent button with the mouse cursor. Regarding the processing steps whose execution designation flags have been set to the value "1", the Nos. of a sequence in which these steps are executed are displayed in terms of numerals in the left margins of the corresponding buttons, in conformity with the processing order indicated in the flow chart of FIG. 13.

Figure 18:
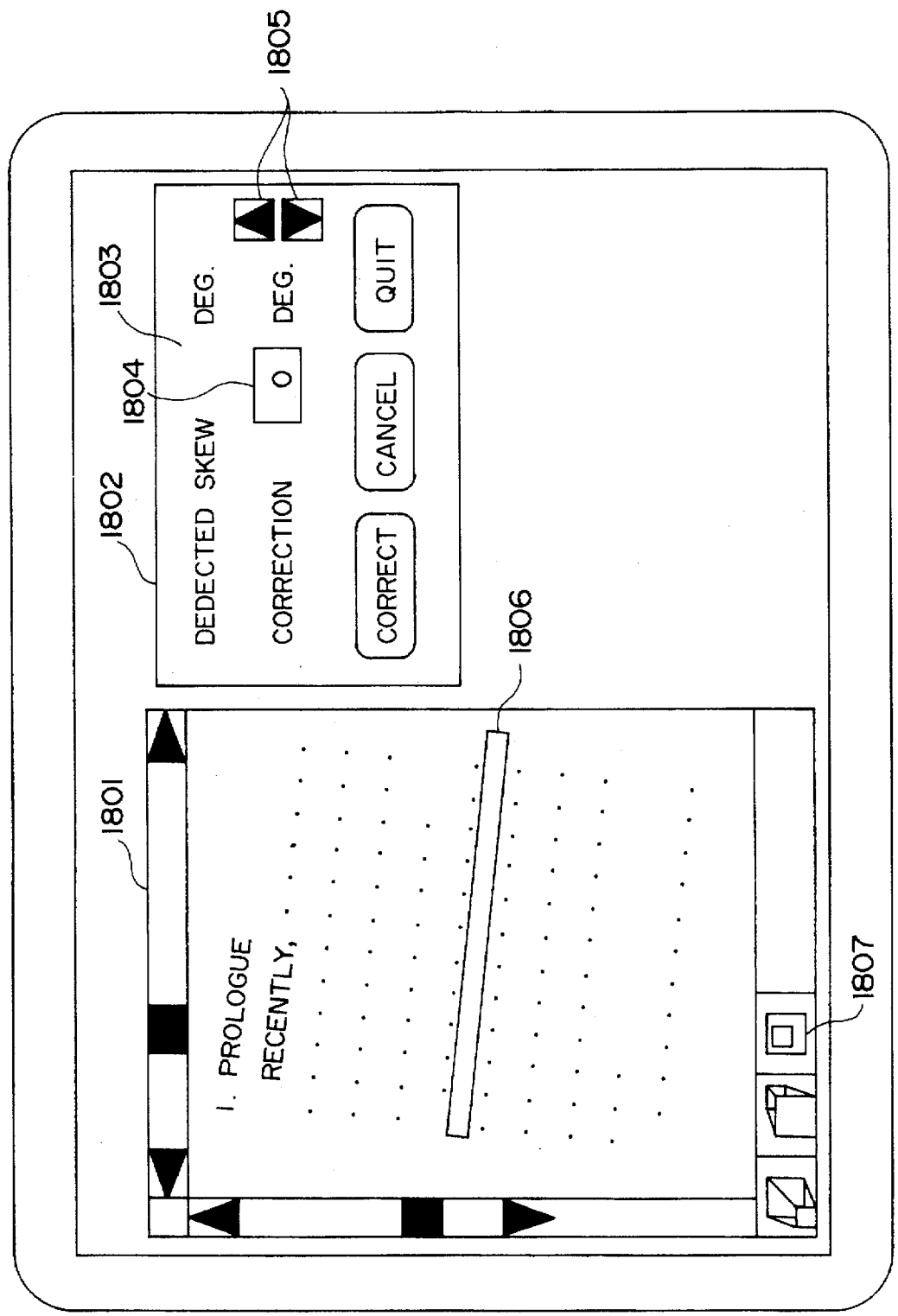
FIG. 18 is a diagram showing a screen for entering the skew of a document image.

FIG. 18 illustrates an example of the screen for correcting the skew of the document image. This screen is opened by clicking the corresponding button within the control panel 1601 shown in FIG. 16. Further, it is opened when selected in the "auto" processing or the "retry" processing. This holds true also of screen examples which will be explained below.

A window 1801 serves to display the entered image. Numeral 1802 represents a skew correcting control panel. Numeral 1803 represents a detected-skew display field which displays the skew of the image automatically detected in the system. When the skew has not been previously detected, nothing is displayed in the detected-skew display field 1803.

A skew input field 1804 is a field through which the operator enters the skew by the use of the keyboard. The operator can also enter the skew by clicking either or both of stepper buttons 1805 by utilizing the mouse cursor. Numeral 1806 denotes a skew display bar. The skew display bar 1806 is in the shape of an oblong of suitable width and length. It is displayed by utilizing graphics, in order that the skew of the oblong may equal the detected skew or the skew entered by the operator. When the operator manipulates the skew input field 1804 or the stepper button 1805, the skew of the skew display bar 1806 is changed in interlocking. Numeral 1807 indicates a button for the operations of expanding and reducing the displayed image.

Figure 19:
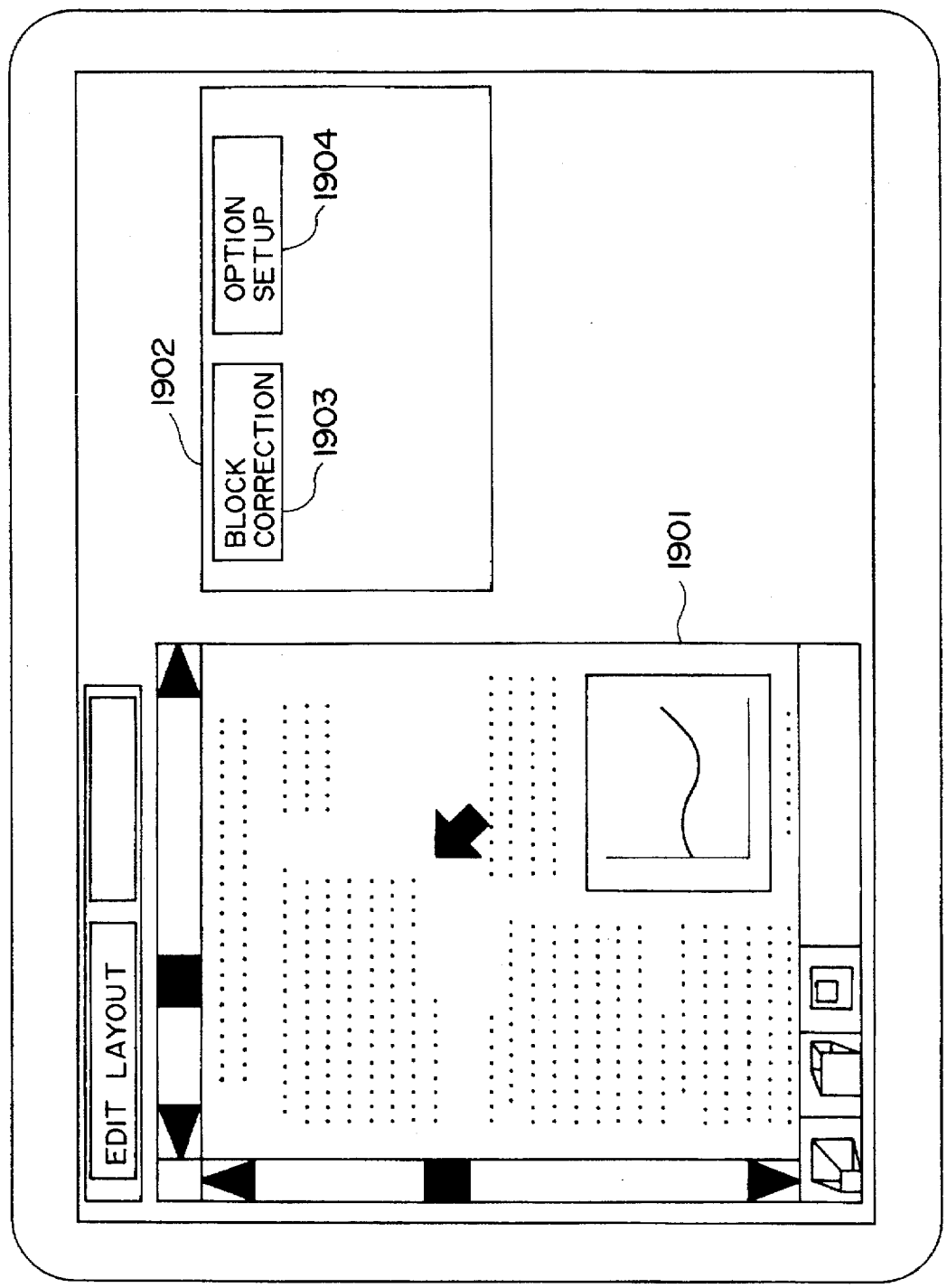
FIG. 19 is a diagram showing a screen for correcting layout.

FIG. 19 illustrates an example of the layout correction screen. A window 1901 is for displaying the entered image. Numeral 1902 denotes a control panel. The control panel 1902 may well be replaced with a pull-down menu, a pop-up menu or the like. A button 1903 serves to start a screen for designating the coordinates of the block. A button 1904 serves to start a screen for setting the options (attributes) of the block.

Figure 20A:
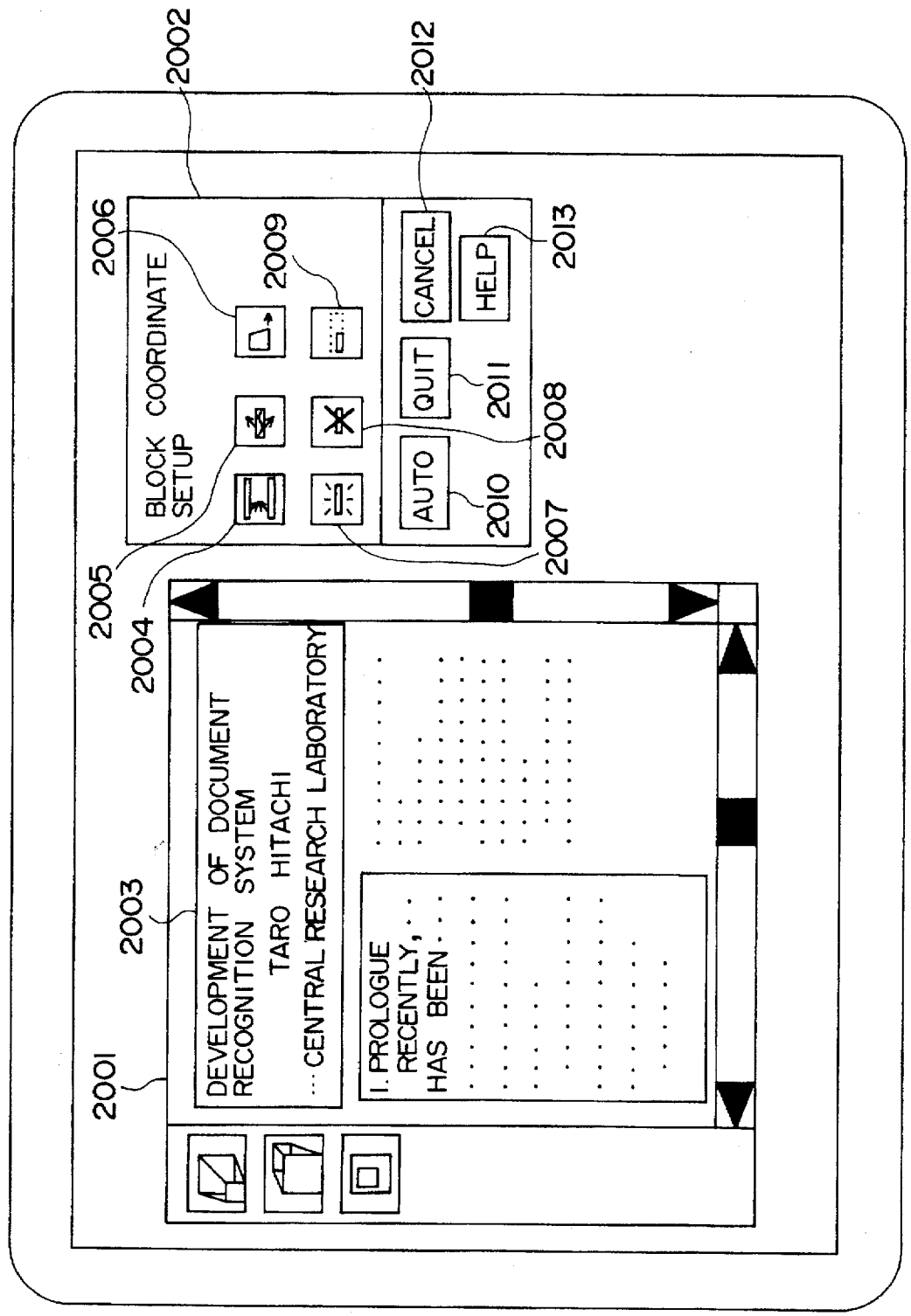
FIG. 20A is a diagram showing a screen for correcting a block.
Figure 20B:
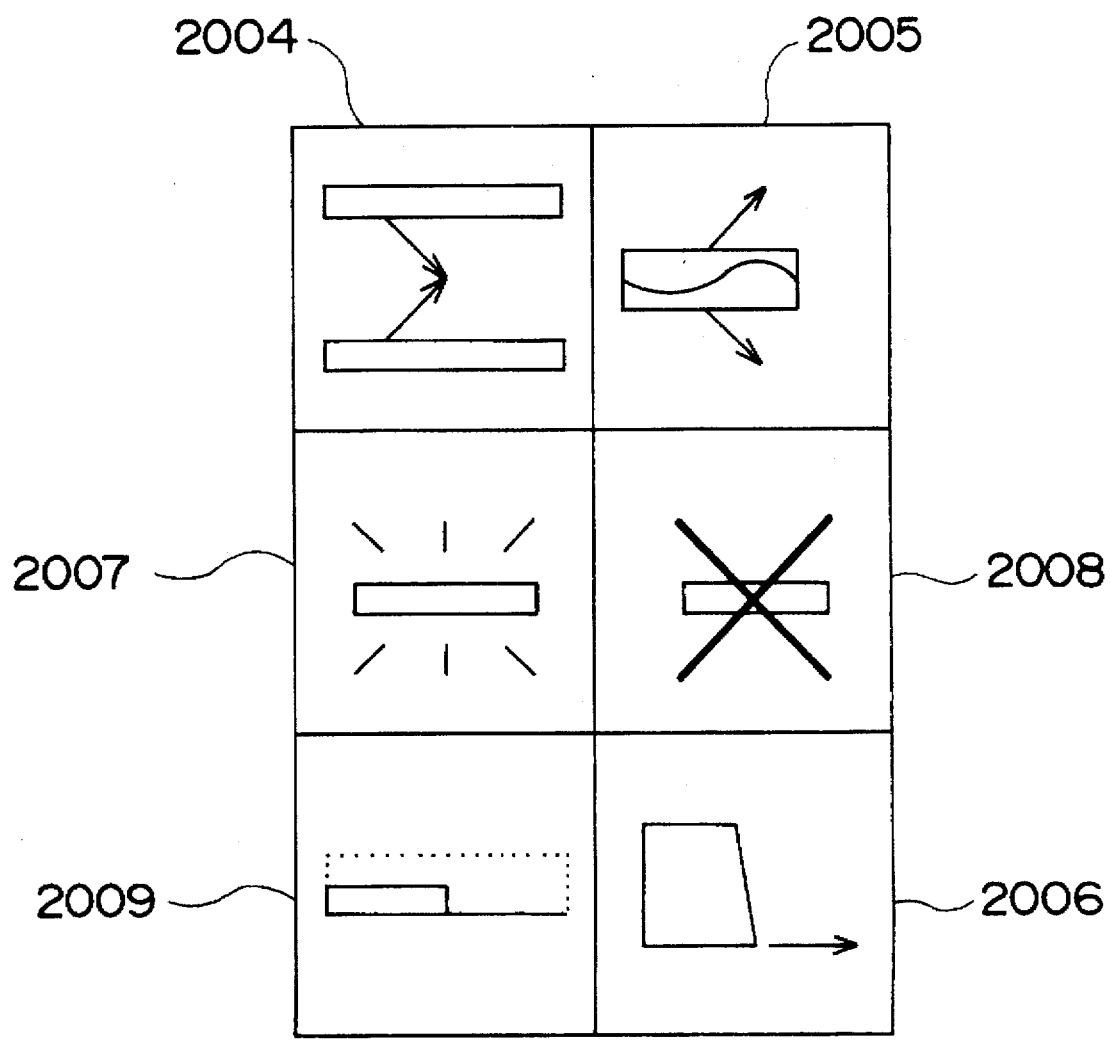
FIG. 20B is a diagram showing a part of FIG. 20A.

FIGS. 20A and 20B illustrate an example of the block correction screen. A window 2001 is for displaying the entered image. This example corresponds to a case where the block is manipulated. Numeral 2002 represents a block setting control panel. The control panel 2002 may well be replaced with a pull-down menu, a pop-up menu or the like. Shown at numeral 2003 is a display image obtained in such a way that the block designated by the set coordinates is expressed as a polygon by utilizing graphics, and that the polygon is displayed in superposition on the document image.

Numeral 2004 indicates a "merge" button for merging two or more blocks. When the operator selects the two or more blocks in the window 2001 by the use of the mouse and thereafter clicks the "merge" button 2004, the processing condition corrector 116 (refer to FIG. 1) deletes data corresponding to the selected area and generates new block data for the selected and concatenated blocks.

Numeral 2005 indicates a "separate" button. When the operator selects a single block in the window 2001 and thereafter clicks the "separate" button 2005, the processing condition corrector 116 deletes data corresponding to the selected block and generates the data of two blocks obtained by equally dividing the single block.

Numeral 2006 indicates a "transform" button. When the operator selects a single block in the window 2001 and thereafter clicks the "transform" button 2006, a control screen for changing the external shape of the block. Numeral 2007 indicates a "new" button. When the operator clicks the "new" button 2007, the processing condition corrector 116 generates new block data, and the generated block data is displayed in the window 2001.

Numeral 2008 represents a "delete" button. When at least one block is selected in the window 2001 and the "delete" button 2008 is thereafter clicked by the operator, the processing condition corrector 116 deletes block data corresponding to the selected block.

Numeral 2009 represents an "expand/reduce" button. When at least one block is selected in the window 2001 and the "expand/reduce" button 2009 is thereafter clicked, the selected block can be expanded or reduced in size by the use of the mouse. A similar screen can also be employed as a user interface for the area correction processing. Numerals 2010, 2011, 2012 and 2013 indicate "auto", "quit", "cancel" and "help" buttons, respectively.

Figure 21:
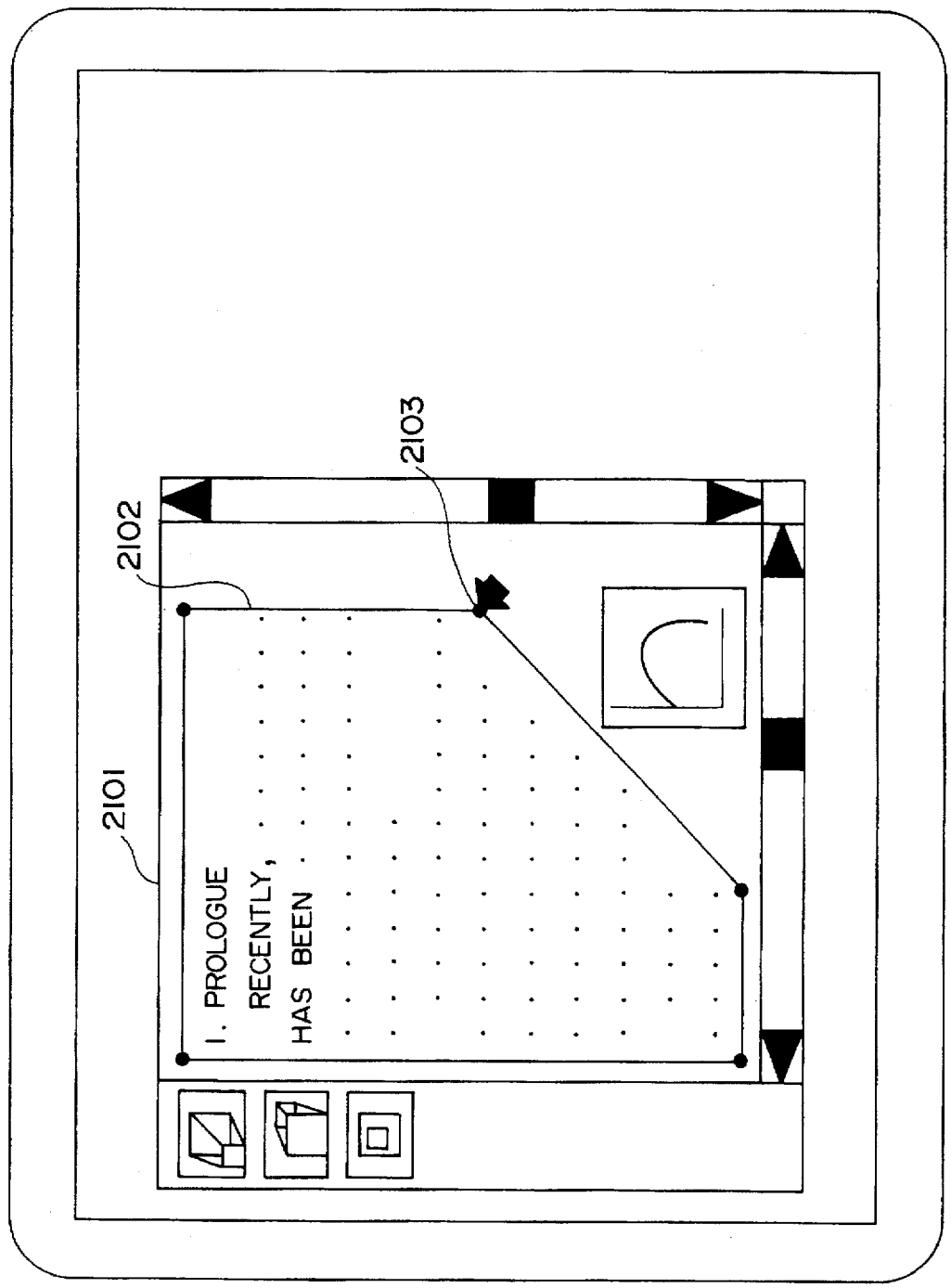
FIG. 21 is a diagram showing a screen for designating a non-rectangular area in the block correction.

FIG. 21 illustrates an example of the screen for designating a non-rectangular area in the setting of the area coordinates (or block coordinates) when the "transform" button 2006 or the "new" button 2007 is clicked in the control panel 2002 for setting the area coordinates as shown in FIG. 20.

A window 2101 is for displaying the entered image. Numeral 2102 denotes an image obtained by displaying the coordinates of the area (or block) in terms of a polygon. The operator drags the apices of the polygon by the use of the mouse cursor indicated at numeral 2103, whereby the coordinates of the area can be changed. Moreover, he/she clicks and then drags any desired position on the lattice of the polygon, whereby a new apex can be generated.

Figure 22:
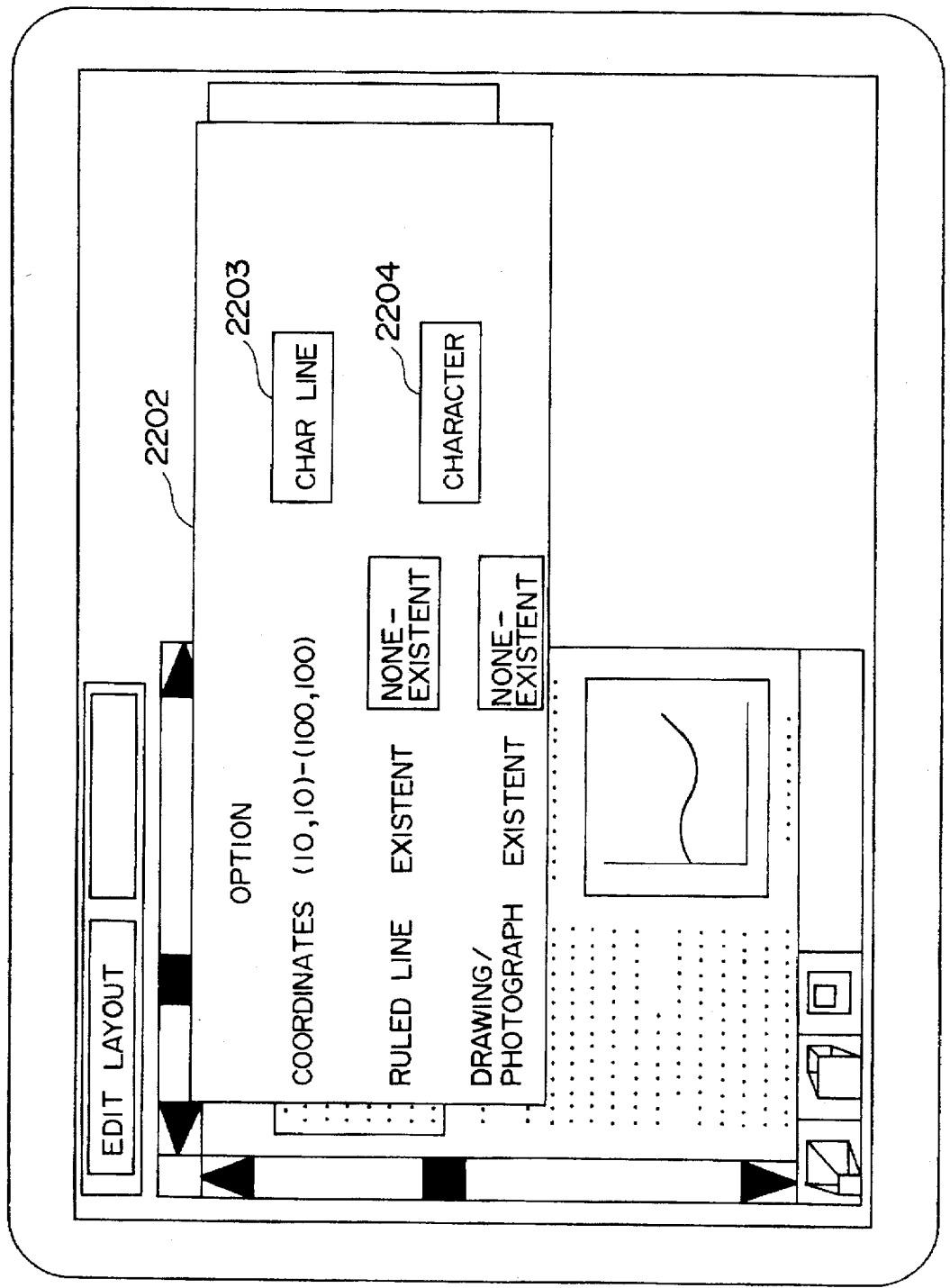
FIG. 22 is a diagram showing a screen for designating the options of an area.

FIG. 22 illustrates an example of the screen for designating the options (attributes) of the area. When the option setup button 1904 is clicked in the screen of FIG. 19, the screen of FIG. 22 is displayed. On a control panel 2202, the operator can correct such options as the existence of ruled lines in the area and the existence of a drawing or photograph.

Figure 23:
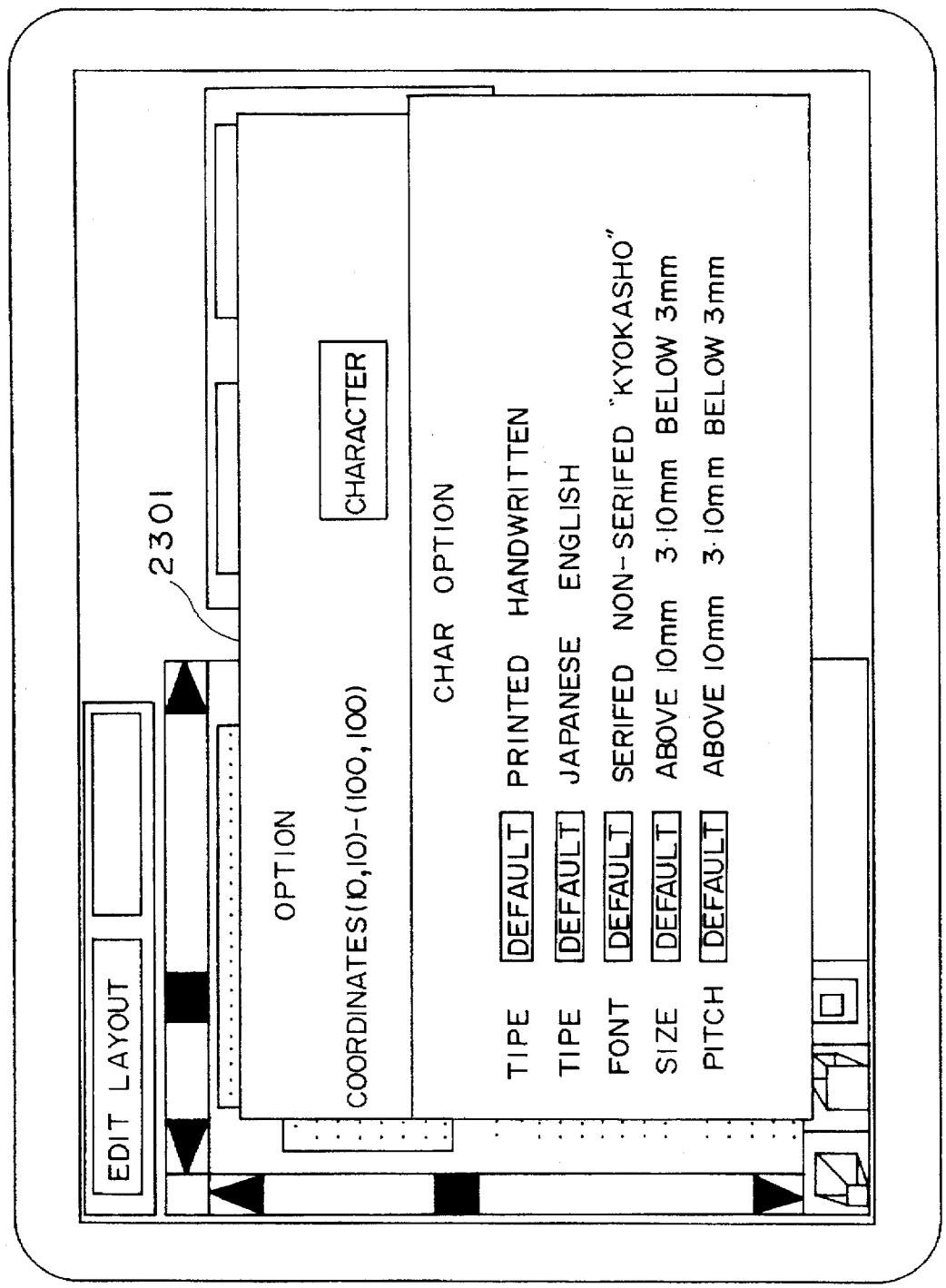
FIG. 23 is a diagram showing a screen for designating the options of characters in the area.

FIG. 23 illustrates an example of the screen for designating the options (attributes) of the characters in the area. This screen is displayed by clicking a character button 2204 in the area option setting screen shown in FIG. 22. The operator can set the options of the characters, such as the character sorts, font type, character size and character pitch, on a control panel 2301.

Figure 24:
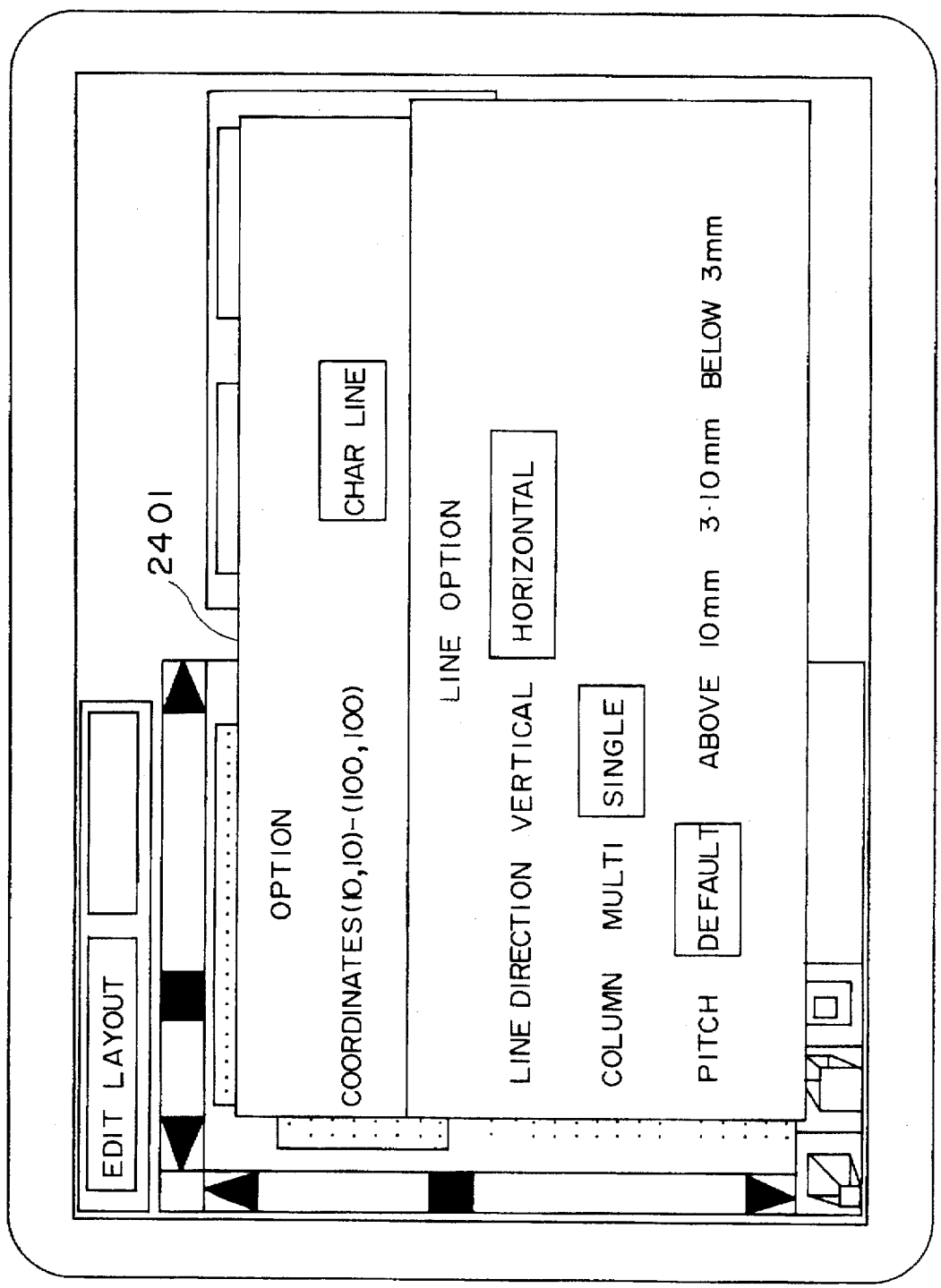
FIG. 24 is a diagram showing a screen for designating the options of character lines in the area.

FIG. 24 illustrates an example of the screen for designating the options (attributes) of the character lines in the area. This screen is displayed by clicking a character line button 2203 in the area option setting screen shown in FIG. 22. The operator can set the options of the character lines, such as the direction of the character lines, the presence or absence of at least two columns and the line pitch, on a control panel 2401.

Figure 25:
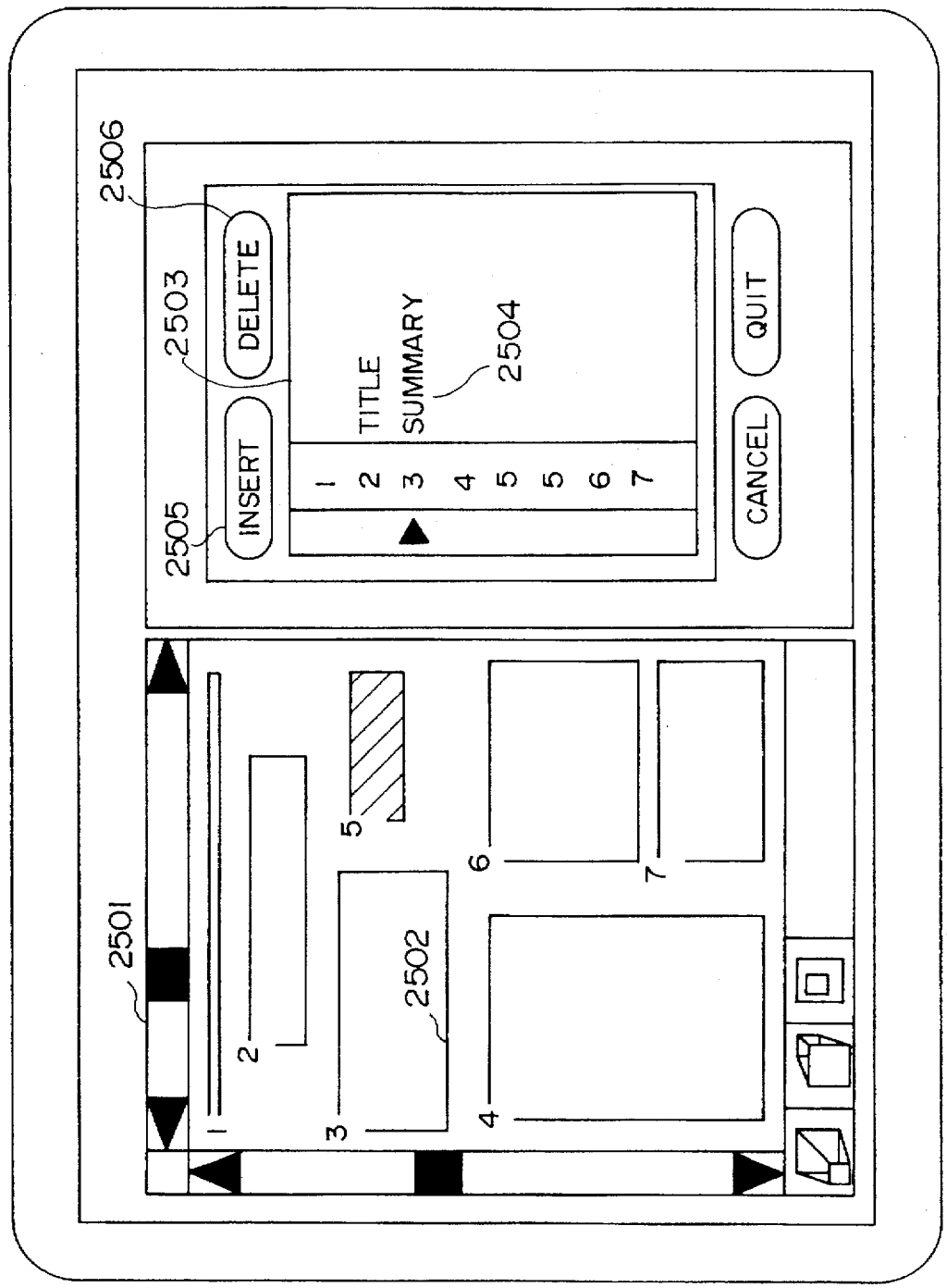
FIG. 25 is a diagram showing a screen for designating the reading sequence of blocks.

FIG. 25 illustrates an example of the screen for designating the reading order (sequence) of the blocks. This screen is displayed when the presence of the plurality of columns is designated on the control panel 2401 shown in FIG. 24.

Numeral 2501 denotes a window in which the blocks in the area are respectively displayed in terms of polygons 2502 etc. In the window 2501, the ID (identification) Nos. of the respective blocks are simultaneously displayed. Numeral 2503 represents a list box for displaying and correcting the reading order of the blocks. The ID Nos. and identifiers of the blocks are listed in the list box 2503, and they are arranged from above in the reading order. The arrangement sequence within the list box 2503 corresponds to the sequence of the chain of the block data. When the contents of the list box 2503 are changed by any operations stated below, the layout corrector 112 (refer to FIG. 1) responsively corrects the array of the chain.

The block identifier is entered through the keyboard or the like by the operator, but it need not always be set. Numeral 2505 represents an "insert" button. When the operator selects one block in the window 2501 and thereafter clicks the "insert" button 2505, the selected block as indicated by numeral 2504 is inserted into the list box 2503. On the other hand, numeral 2506 represents a "delete" button. When the operator designates at least one block in the list box 2503 and thereafter clicks the "delete" button 2506, the designated block is deleted from this list box. The block identifier or ID No. is designated in the list box 2503 and is thereafter dragged upwards or downwards by the use of the mouse, whereby the designated block can be moved to any desired position in the list. Thus, the reading order of the blocks is changed. As a result, the chain structure based on the next-block data pointers of the block data is changed in the data format shown in FIG. 12.

Figure 26A:
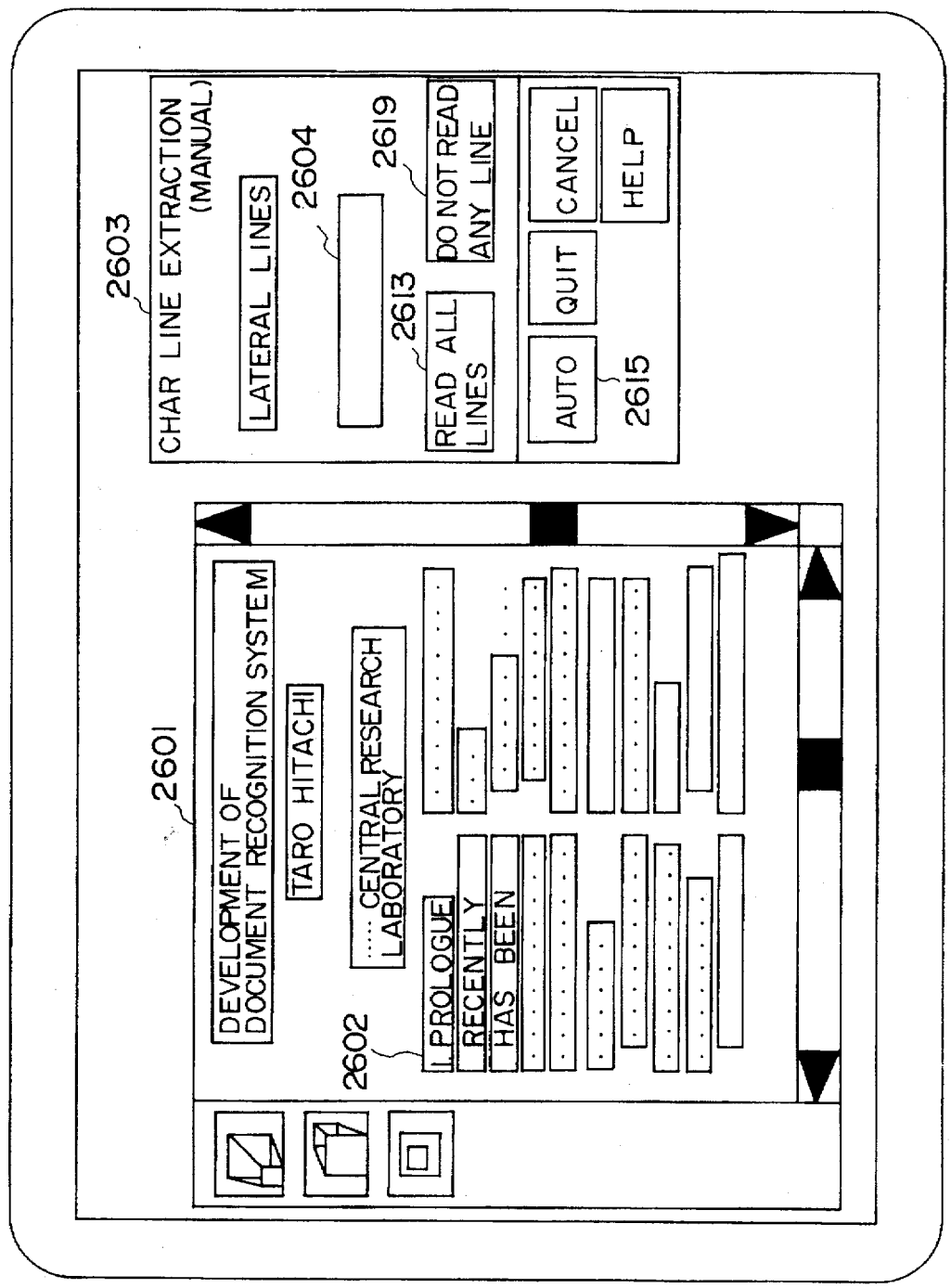
FIG. 26A is a diagram showing a screen for correcting the coordinates and options of the character lines.
Figure 26B:
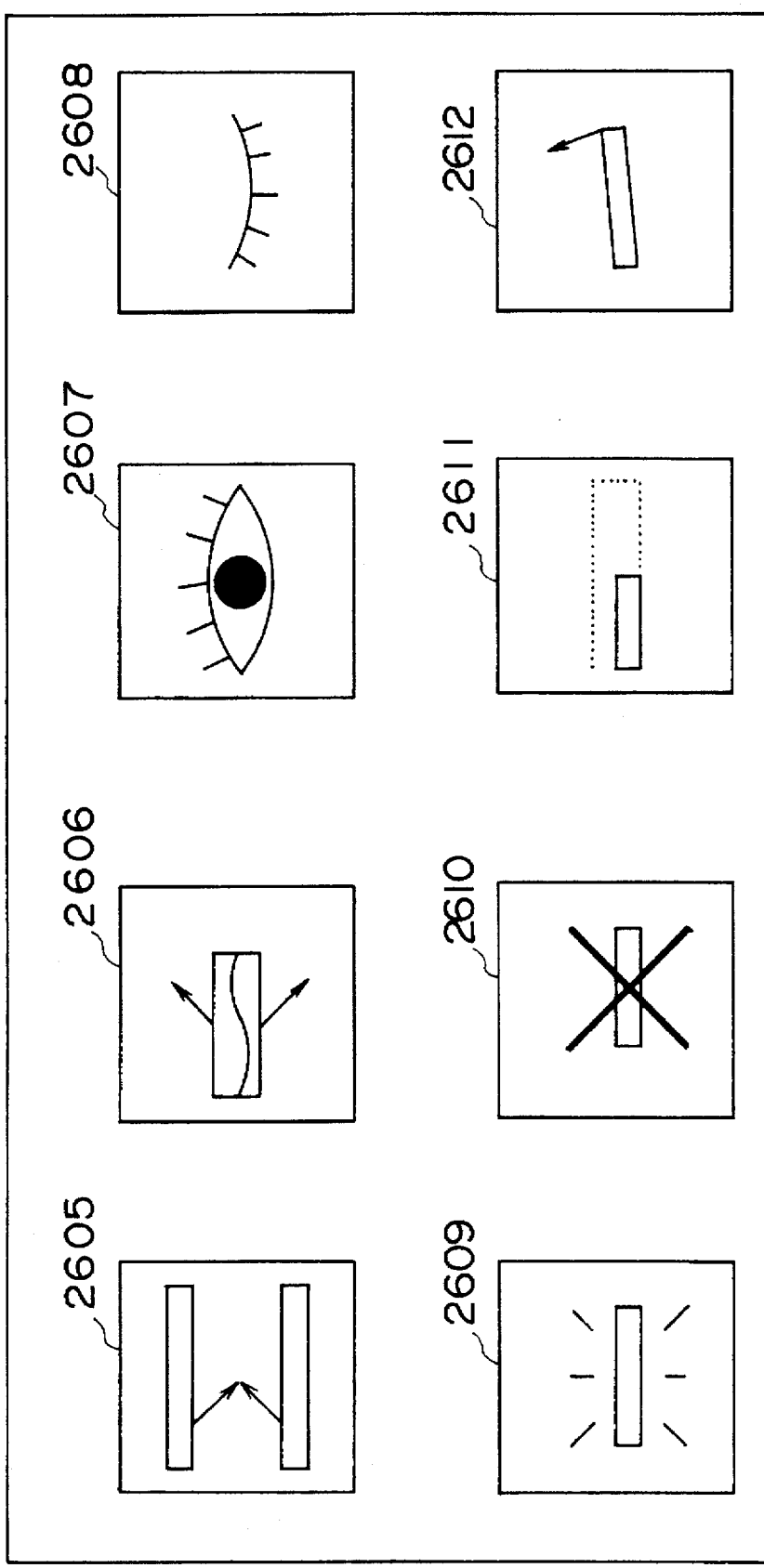
FIG. 26B is a diagram showing a part of FIG. 26A.

FIGS. 26A and 26B illustrate an example of the screen for correcting the coordinates and options (attributes) of the character line or lines.

A window 2601 is for displaying the entered image. Numeral 2602 denotes a display image obtained in such a way that a frame indicative of the set character line is displayed as a polygon in superposition on the document image by utilizing graphics. Numeral 2603 represents a character line correcting control panel. The control panel 2603 may well be replaced with a pull-down menu, a pop-up menu or the like.

Numeral 2604 denotes a window which contains a group of buttons 2605 thru 2612 depicted in FIG. 26B. The button 2605 is a "merge" button for merging two or more successive character lines. When the operator selects the two or more character lines in the window 2601 by the use of the mouse and thereafter clicks the "merge" button 2605, the character line corrector 111 (refer to FIG. 1) deletes data (FIG. 12) corresponding to the selected character lines and generates new character line data for the selected and concatenated character lines.

The button 2606 is a "separate" button. When the operator selects a single character line in the window 2601 and thereafter clicks the "separate" button 2606, the character line corrector 111 deletes data corresponding to the selected character line and generates the data of two character lines obtained by equally dividing the single character line.

The button 2607 is a "read" designation button, while the button 2608 is an "unread" designation button. Owing to the "read" designation button 2607 and the "unread" designation button 2608, the operator can designate whether or not the pertinent character line is set as the object of the recognition.

The button 2609 is a "new" button. When the operator clicks the "new" button 2609, the character line corrector 111 generates new character line data, and the generated character line data is displayed in the window 2601.

The button 2610 is a "delete" button. When at least one character line is selected in the window 2601 and the "delete" button 2610 is thereafter clicked, the character line corrector 111 deletes character line data corresponding to the selected character line.

The button 2611 is an "expand/reduce" button. When at least one character line is selected in the window 2601 and the "expand/reduce" button 2611 is thereafter clicked, the frame of the selected character line can be expanded or reduced in size by the use of the mouse.

The button 2612 is a skew correction button. When at least one character line is selected in the window 2601 and the skew correction button 2612 is thereafter clicked, the skew of only the specified character line selected can be corrected by use of the mouse.

Meanwhile, numeral 2613 denotes a "read all lines" button. When one or more character lines are selected in the window 2601 and the "read all lines" button 2613 is thereafter clicked, all of the selected character lines can be set as the object of the recognition.

Numeral 2619 denotes a "do not read any line" button. When the "do not read any line" button 2619 is clicked, all the character lines can be removed from the object of the recognition. This contrivance can be utilized in, e.g., the following case: When only some character lines are to be set as the object of the recognition, the "do not read any line" button 2619 is first clicked, the character lines of the object of the recognition are subsequently selected, and the "read" designation button 2607 is lastly clicked.

Numeral 2615 denotes an "auto" button. When the "auto" button 2615 is clicked, the character line detector 103 (refer to FIG. 1) is started, and character line data generated anew substitutes for data which is being corrected.

Figure 27:
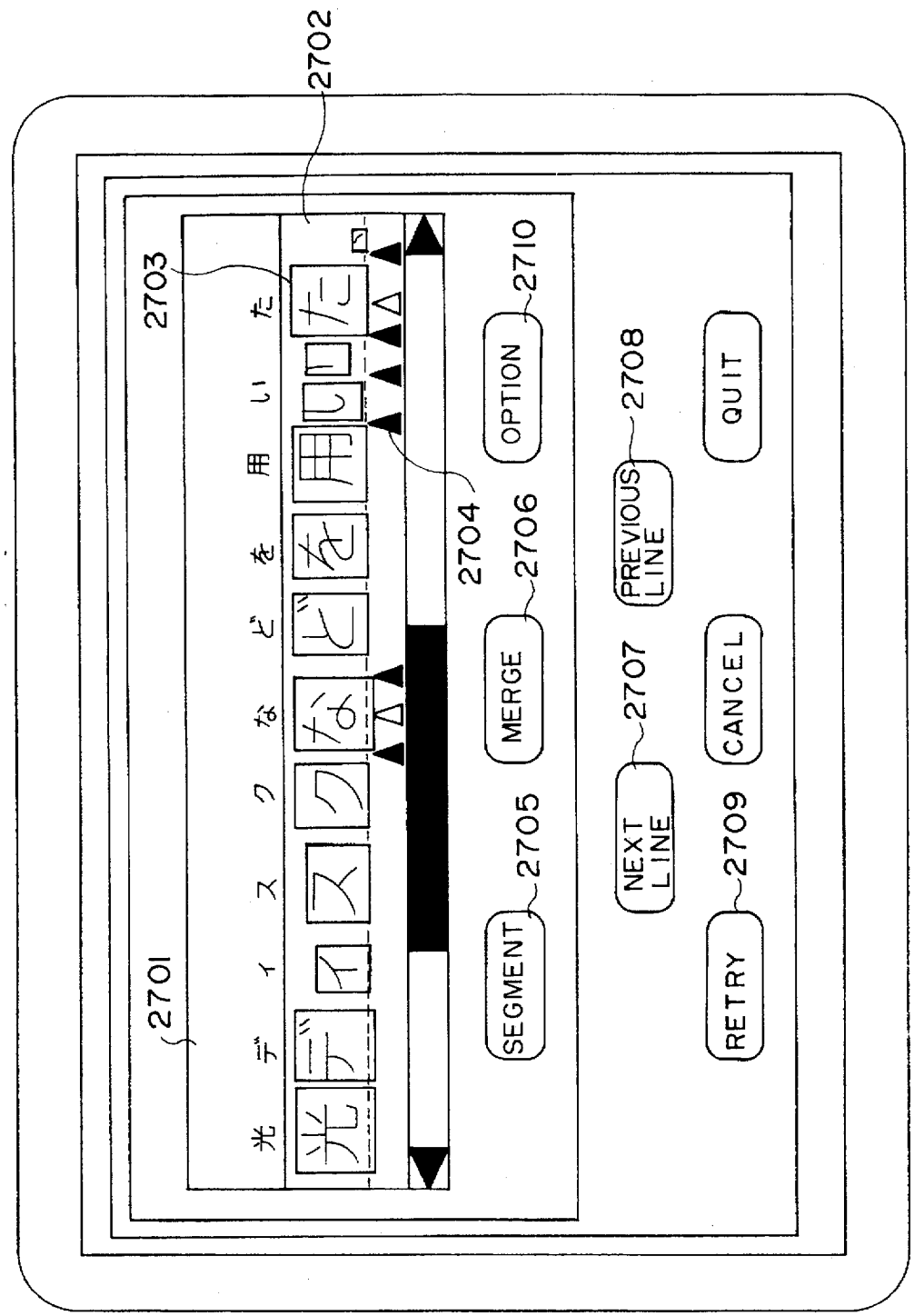
FIG. 27 is a diagram showing a screen for correcting the result of character segmentation.

FIG. 27 illustrates an example of the screen for correcting the results of the character segmentation. Numeral 2701 indicates a field for displaying the text of the recognized result. Numeral 2702 indicates a field for displaying the image of the character line on an enlarged scale. Numeral 2703 indicates the image in which character patterns derived from the character segmentation results are displayed along with a surrounding oblong frame.

Numeral 2704 represents arrows indicative of the segmentation positions of the characters. The segmentation position judged to be more probable in the recognition of the system is indicated by the black arrow, whereas the segmentation position judged to be less probable is indicated by the white arrow. To this end, the character segmentor 105 (refer to FIG. 1) detects and holds the segmentation positions. The operator can correct the positional coordinates of the oblong at the numeral 2703 or the segmentation positions at the numeral 2704 by the use of the mouse.

Numeral 2705 denotes a "segment" button. When the operator clicks and designates a character pattern in the field 2702 and thereafter clicks the "segment" button 2705 by the use of the mouse, the character segmentation corrector 113 (refer to FIG. 1) deletes data corresponding to the selected character and generates the data of two characters obtained by equally dividing the character pattern.

Numeral 2706 denotes a "merge" button. When the operator clicks and designates two or more character patterns in the field 2702 and thereafter clicks the "merge" button 2706 by use of the mouse, the character segmentation corrector 113 deletes character data corresponding to the selected character patterns and generates new character data for the selected and concatenated character patterns.

Numeral 2710 denotes an option button. When the operator clicks and designates two or more character patterns in the field 2702 and thereafter clicks the option button 2710 by the use of the mouse, he/she can change the options (attributes) of the pertinent character patterns, such as the character sorts and the font type, recognized by the system.

Numerals 2707 and 2708 denote a next-line button and a previous-line button, respectively. Owing to the next-line button 2707 or previous-line button 2708, the character line to-be-corrected can be changed to the directly succeeding line or directly preceding line in the document.

Numeral 2709 denotes a "retry" button. When the operator corrects the character segmentation or character option and thereafter clicks the "retry" button 2709, the "retry" controller 117 (refer to FIG. 1) starts the "retry" (re-recognition) processing. It is also allowed to employ a construction in which the "retry" button 2709 is not provided and in which, each time the correction is made, the "retry" processing is started and the result thereof is displayed, whereby the corrections are iteratively accepted.

Figure 28:
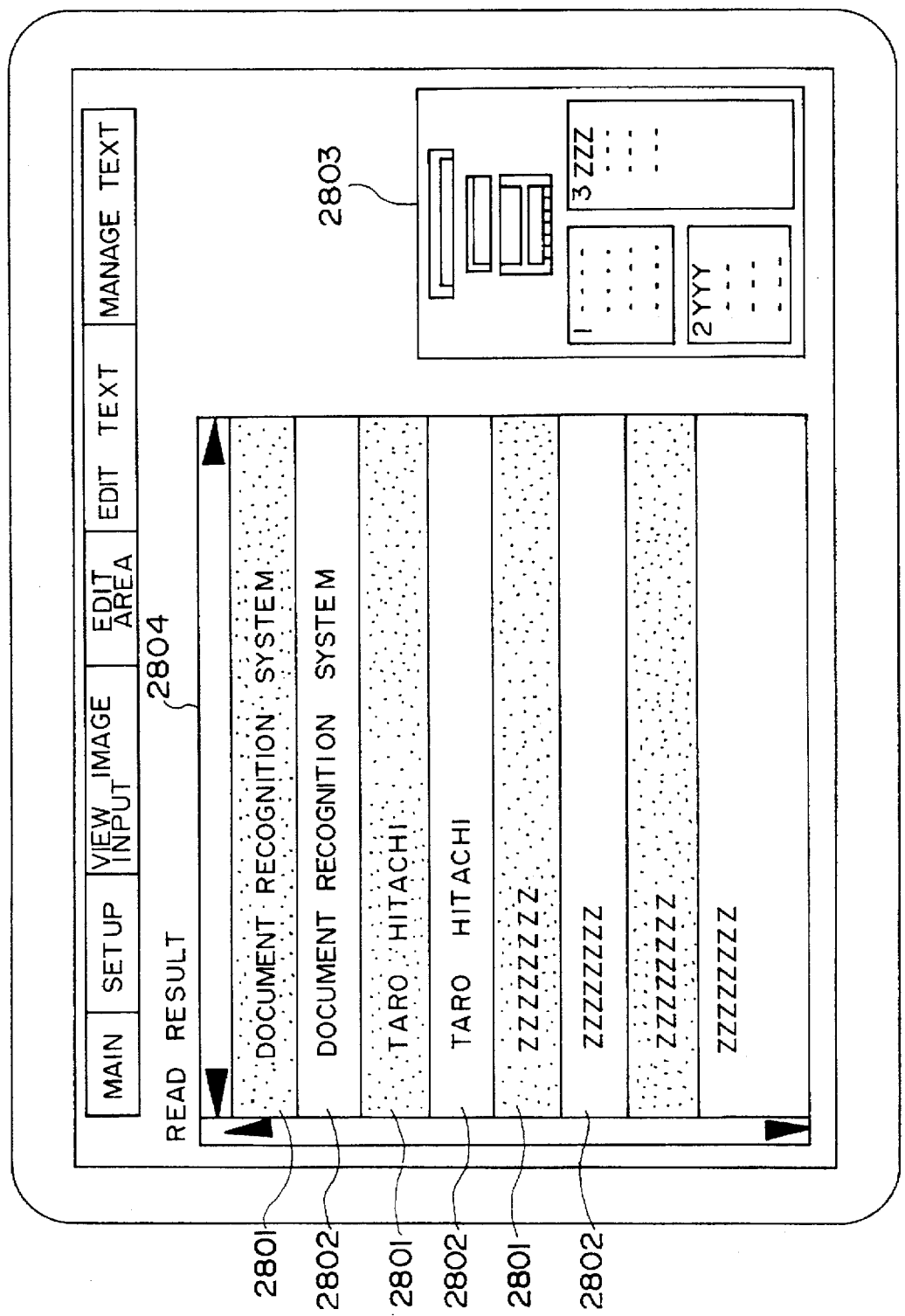
FIG. 28 is a diagram showing a screen for correcting the result of character recognition.

FIG. 28 illustrates an example of the display screen for the character correction. Although the text data of the character recognition results can be corrected on the screen shown in FIG. 16, FIG. 28 exemplifies another screen for correcting the character recognition results.

Numeral 2804 denotes a window, in which fields 2801 for displaying the enlarged images of the respective character lines and fields 2802 for displaying the text codes of the recognized results are alternately arranged. The character lines being currently displayed are indicated by black bold lines which are displayed in superposition on the whole image in a window 2803. It is also allowed to employ a construction in which candidate characters obtained in the course of the recognition are displayed for the correction of a character, and in which one of the candidate characters selected by the operator can be set as a corrected character.

Figure 29:
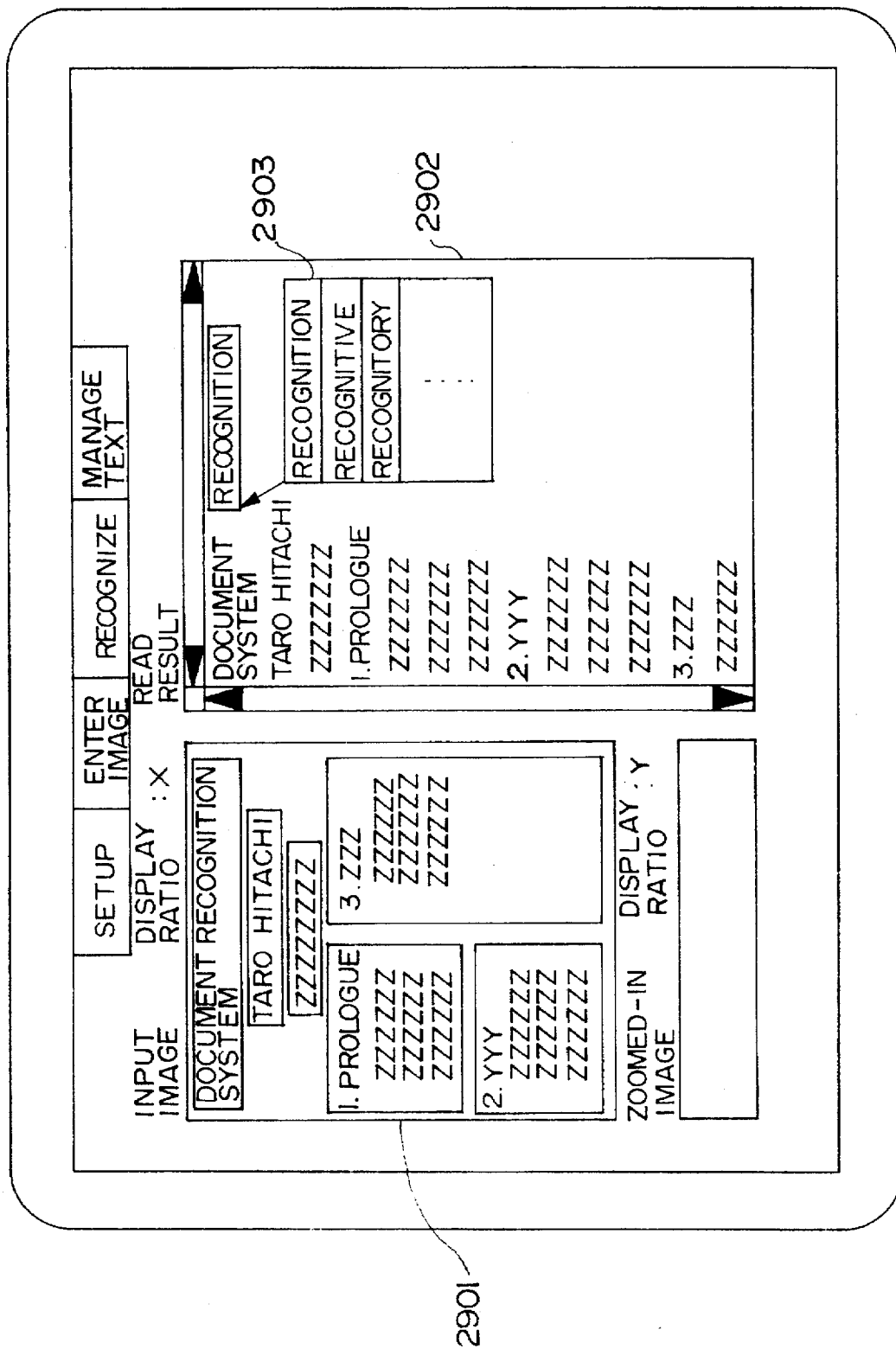
FIG. 29 is a diagram showing a screen for correcting the result of language processing.

FIG. 29 illustrates an example of the phrase correction screen for correcting the result of the postprocessing (language processing). Numeral 2901 denotes a window for displaying the entered image. Numeral 2902 denotes an image for displaying the text data of the recognized result. When any desired character in the image 2902 is double-clicked with the mouse cursor, candidate phrases obtained in the course of the language processing as indicated at numeral 2903 are displayed in terms of a pop-up menu. When any of the displayed candidate phrases is clicked, the pertinent phrase is replaced with the designated phrase.

Figure 30:
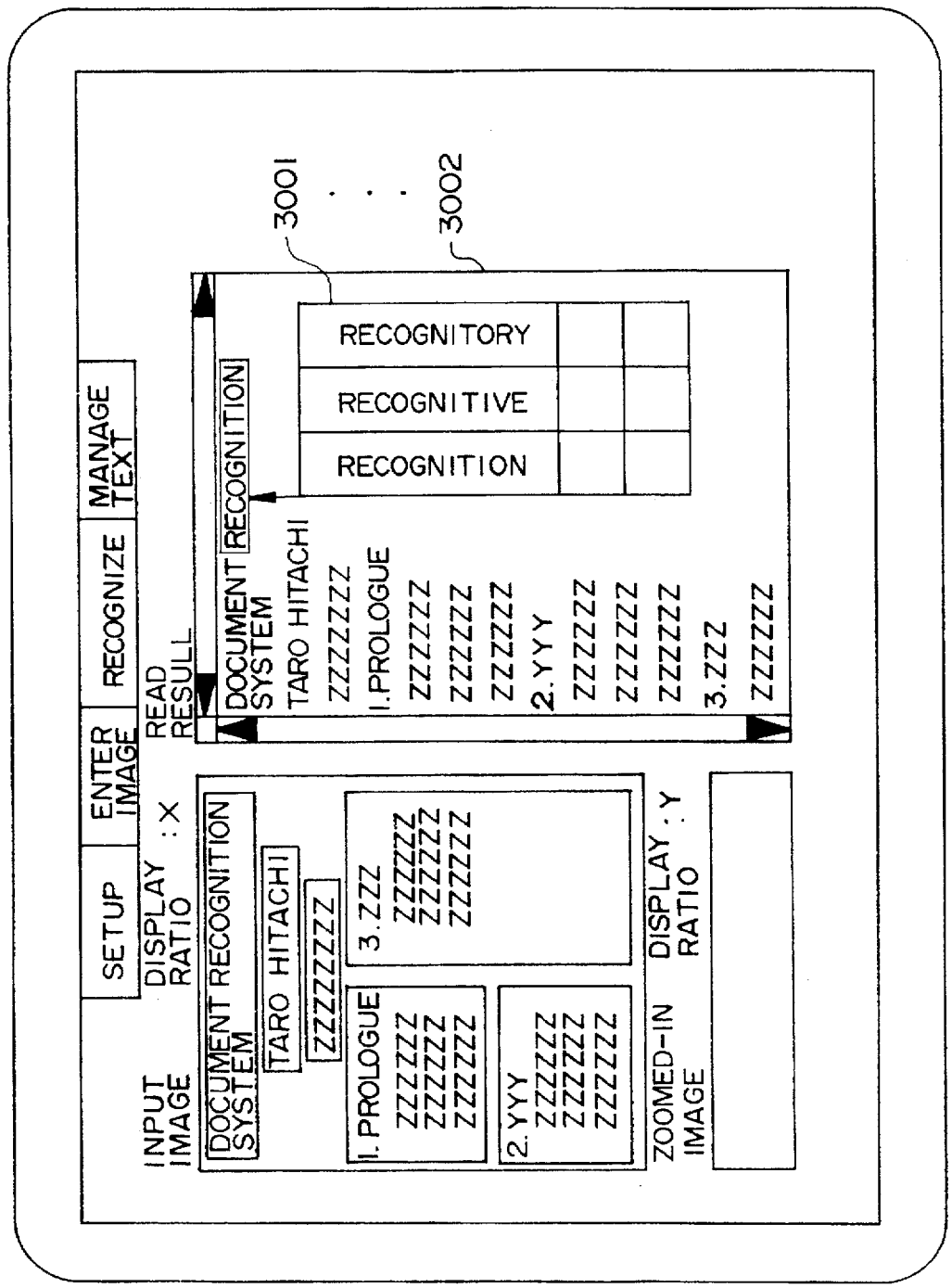
FIG. 30 is a diagram showing another screen for correcting the result of the language processing.
Figure 31:
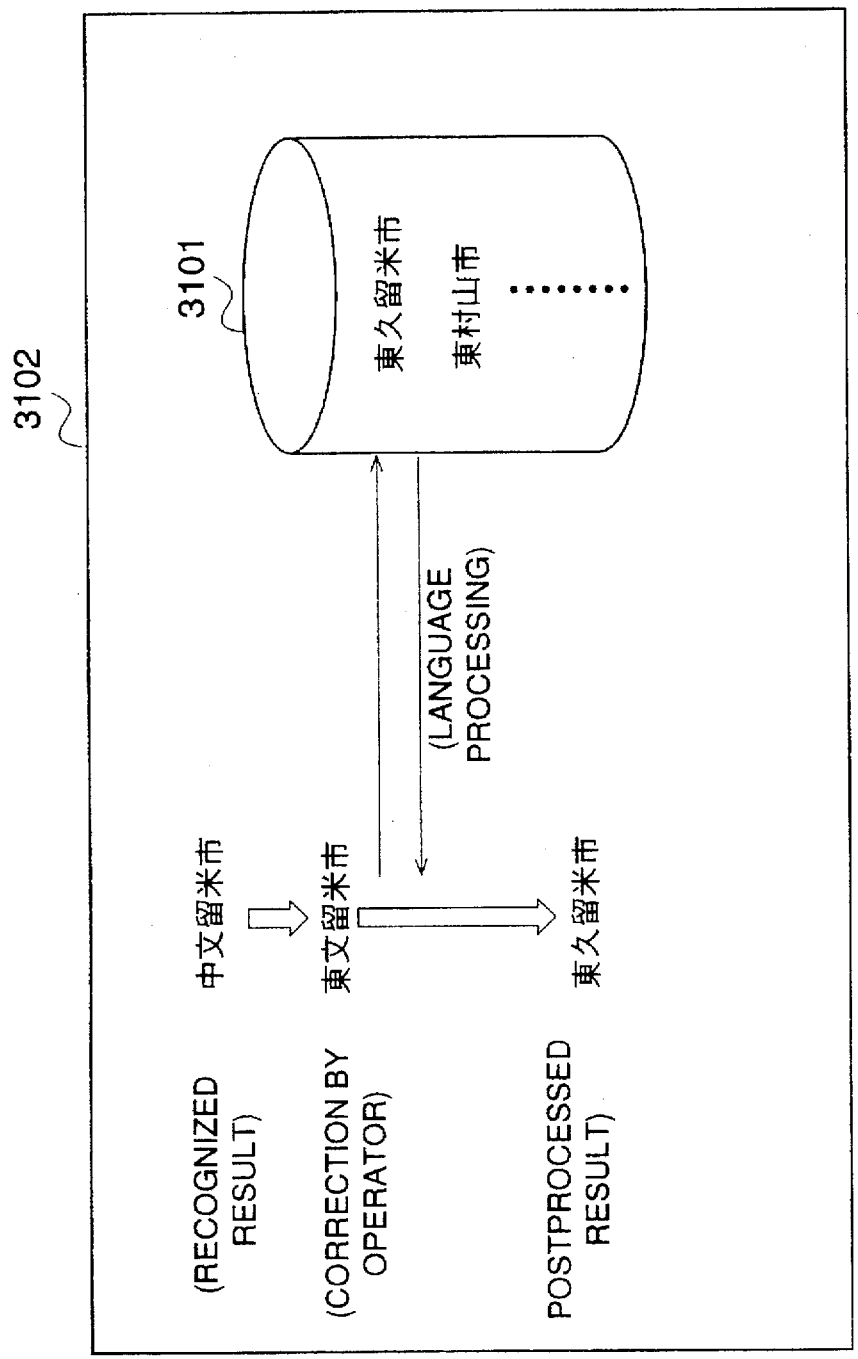
FIG. 31 is a diagram for explaining the language processing.

FIG. 30 illustrates another example of the phrase correction screen for correcting the result of the postprocessing (language processing). In the same manner as in the explanation of the example in FIG. 29, when any desired character in an image 3002 is double-clicked with the mouse cursor, candidate phrases obtained in the course of the language processing as indicated at numeral 3001 are displayed in terms of a pop-up menu. From among the displayed candidate phrases, a correct phrase can be designated using the ten-key pad of the keyboard.

According to the present invention described above, recognized results can be efficiently corrected for recognition errors which develop at many processing steps in a text reader, such as a layout analysis, character line extraction, character segmentation, character recognition and language processing.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A document recognition system wherein characters on a document are recognized from an image of the document, and at least the recognized characters are displayed on a display unit, comprising:

input means for entering the document image which is an object to be recognized;

character line extraction means for obtaining character line data which indicate limits of a character line formed of a character string, including either of a frame and a block surrounding said character string, on said document image entered by said input means, wherein said frame and said block indicate a set character line displayed as a polygon in superposition of the document image by utilizing graphics;

character line correction means for presenting the limits of the character line obtained by said character line extraction means to a user of said document recognition system, superimposed on said document image on said display unit, and for correcting said limits of said character line in accordance with an instruction given by the user;

character segmentation means for deriving character patterns of the individual characters contained in said character line, from said document image on the basis of the character line data;

character recognition means for recognizing the character patterns derived by said character segmentation means, and for converting the recognized character patterns into respectively corresponding character codes; and display means for causing said display unit to display the character codes of said characters recognized by said character recognition means.

2. A document recognition system as defined in claim 1, wherein said character line correction means makes the correction so that two character lines displayed adjacent to each other on said display unit may be connected into a single character line.

3. A document recognition system as defined in claim 1, wherein said character line correction means makes the correction so that a single character line displayed on said display unit may be separated into two character lines.

4. A document recognition system as defined in claim 1, further comprising skew alteration means for detecting a skew of said document image on the basis of said character line data extracted by said character line extraction means, and for subjecting said document image to rotation processing on the basis of the detected skew, so as to alter said skew.

5. A document recognition system as defined in claim 1, further comprising layout analysis means for recognizing blocks, each including a plurality of character lines, and for determining a sequence in which a the plurality of blocks are read, wherein said character segmentation means and said character recognition means execute the respectively corresponding processing for the individual character lines in the reading sequence of the plurality of blocks.

6. A document recognition system as defined in claim 5, further comprising layout correction means including first means for presenting limits of blocks recognized by said layout analysis means superimposed on said document image on said display unit, and second means for altering the presented limits of said blocks in accordance with an alteration instruction given by the user.

7. A document recognition system as defined in claim 6, wherein said layout correction means further includes third means for altering the reading sequence of the plurality of blocks.

8. A document recognition system as defined in claim 1, further comprising language processing means for recognizing any inappropriate phrase in text data which includes of said character codes of the character string recognized by said character recognition means, with reference to a language dictionary, and for presenting the inappropriate phrase to the user on said display unit.

9. A document recognition system as defined in claim 8, further comprising phrase correction means for correcting said inappropriate phrase in accordance with an instruction which is given by the user in response to the presentation of said inappropriate phrase by said language processing means.

10. A document recognition system as defined in claim 1, further comprising skew correction means for correcting skew angle of said document image displayed on said display unit which has been detected by said system, in accordance with an instruction given by the user.

11. A document recognition system as defined in claim 1, wherein said character segmentation means detects first character segmentation positions being the most likely to be actual boundaries of characters included in said character line and second character segmentation positions being next most likely to be actual boundaries of characters included in said character line, and said document recognition system further comprises character segmentation correction means for presenting the first and second character segmentation positions to the user superimposed on said document image on said display unit, for correcting the character segmentation.

12. A document recognition system wherein characters on a document are recognized from an image of the document, and at least the recognized characters are displayed on a display unit, comprising:

input means for entering the document image which is an object to be recognized;

character line extraction means for obtaining character line data which indicate limits of a character line formed of a character string, including either of a frame and a block surrounding said character string, on said document image entered by said input means, wherein said frame and block indicate a set character line displayed as a polygon in superposition of the document image by utilizing graphics;

layout analysis means for recognizing blocks including a plurality of character lines, and for determining a sequence in which the plurality of blocks are read;

character segmentation means for detecting first character segmentation positions being the most likely to be actual boundaries of characters included in said character line and second character segmentation positions being next most likely to be actual boundaries of characters included in said character line, and for successively deriving character patterns of the individual characters contained in said character lines, divided at the first character segmentation positions, from said document image, on the basis of the sequence in which the plurality of blocks are read;

character recognition means for recognizing the character patterns derived by said character segmentation means, and for converting the recognized character patterns into respectively corresponding character codes;

language processing means for recognizing any inappropriate phrase in text data which includes the character codes of the character string recognized by said character recognition means, with reference to a language dictionary;

display means for causing said display unit to display a processed result of said language processing means;

character line correction means for presenting the limits of the character line obtained by said character line extraction means to a user of said document recognition system, superimposed on said document image on said display unit, and for correcting said limits of said character line in accordance with an instruction given by the user;

skew correction means for correcting a skew angle of said document image displayed on said display unit which has been detected by said system, in accordance with an instruction given by said user;

layout correction means for presenting limits of the blocks recognized by said layout analysis means, to said user superimposed on said document image on said display unit, and for correcting the presented limits of said blocks in accordance with an instruction given by said user;

character segmentation correction means for presenting said first and second character segmentation positions to said user superimposed on said document image on said display unit, for correcting the character segmentation;

character correction means for presenting said characters corresponding to said character code obtained by said character recognition means, to said user on said display unit, and for correcting said character codes in accordance with an instruction given by said user;

phrase correction means for presenting the inappropriate phrase recognized by said language processing means to said user, and for correcting said inappropriate phrase in accordance with an instruction given by said user;

means for selectively starting any selectable one of said character line correction means, said layout correction means, said character segmentation correction means, said character correction means and said phrase correction means, immediately after any of the processing steps of said character line extraction means, said layout analysis means, said character segmentation means, said character recognition means and said language processing means; and retry control means which includes:
  a control table for defining, for each of said character line correction means, said layout correction means, said character segmentation correction means, said character correction means and said phrase correction means, combinations of a plurality of means to perform processing after an operation of said each of said correction means, each of said combinations being selected from a group including said character line extraction means, said layout analysis means, said character segmentation means, said character recognition means and said language processing means, and
  start means for automatically activating, after an operation of one of said correction means, said means included in one of the combinations selected with respect to said one of said correction means, with reference to said control table.

13. A document recognition system as defined in claim 12, further comprising batch control means which includes:
  a control table for defining a combination selected from any of said character line extraction means, said layout analysis means, said character segmentation means, said character recognition means, said language processing means, said character line correction means, said layout correction means, said character segmentation correction means, said character correction means and said phrase correction means, along with a sequence of activation of said means defined in said control table, and
  means for automatically activating said means defined in said control table, in the sequence of activation.

14. A document recognition method wherein characters on a document are recognized from an image of the document, and at least the recognized characters are displayed on a display unit, said method comprising the steps of:
  inputting the document image which is an object to be recognized;
  gaining character line data which indicate limits of a character line formed of a character string, including either of a frame and a block surrounding said character string, on the input document image, thereby extracting the character line, wherein said frame and block indicate a set character line displayed as a polygon in superposition of the document image by utilizing graphics;
  displaying the limits of the extracted character line superimposed on said document image on said display unit;
  altering said limits of said character line displayed on said display unit, thereby correcting the character line data;
  deriving character patterns of the individual characters contained in said character line, from said document image based on the corrected character line data;
  recognizing the derived character patterns, and converting the recognized character patterns into respectively corresponding character codes; and
  display the character codes on said display unit,
    wherein the step of correcting said character line data alters the limits of said character line on said display unit so that two extracted character lines may be connected into a single character line, thereby correcting said character line data.

15. A document recognition method as defined in claim 14, wherein the step of correcting said character line data alters said limits of said character line on said display unit so that a single extracted character line may be separated into two character lines, thereby correcting said character line data.

16. A document recognition system as defined in claim 12, wherein said character line correction means alters the limits of said character line on said display unit so that two character lines displayed adjacent to each other on said display unit may be connected into a single character line.

17. A document recognition system as defined in claim 12, wherein said character line correction means alters the limits of said character line on said display unit so that a single character line displayed on said display unit may be separated into two character lines.

18. A document recognition system as defined in claim 12, wherein said skew correction means detects a skew of said document image on the basis of said character line data extracted by said character line extraction means, and subjects said document image to rotation processing on the basis of the detected skew, so as to alter said skew.

19. A document recognition method as defined in claim 14, wherein the step of correcting said character line data alters said limits of said character line on said display unit so that two character lines displayed adjacent to each other on said display unit may be connected into a single character line.

20. A document recognition method as defined in claim 14, further including the steps of:

detecting a skew of said document image on the basis of the extracted character line data; and subjecting the document image to rotation processing on the basis of the detected skew, so as to alter the skew.

21. A document recognition system as defined in claim 12, wherein said layout correction means further alters the reading sequence of the plurality of blocks.

* * * * *